United States Patent
Matsuzawa et al.

(10) Patent No.: US 9,894,233 B2
(45) Date of Patent: Feb. 13, 2018

(54) LIGHTING APPARATUS AND IMAGE READING APPARATUS

(71) Applicant: Mitsubishi Electric Corporation, Chiyoda-ku (JP)

(72) Inventors: Taku Matsuzawa, Chiyoda-ku (JP); Akiko Fujiuchi, Chiyoda-ku (JP); Toshiaki Shoji, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 15/126,516

(22) PCT Filed: Mar. 3, 2015

(86) PCT No.: PCT/JP2015/056236
§ 371 (c)(1),
(2) Date: Sep. 15, 2016

(87) PCT Pub. No.: WO2015/141461
PCT Pub. Date: Sep. 24, 2015

(65) Prior Publication Data
US 2017/0085738 A1    Mar. 23, 2017

(30) Foreign Application Priority Data
Mar. 17, 2014    (JP) .................................. 2014-053335

(51) Int. Cl.
*H04N 1/04*    (2006.01)
*H04N 1/03*    (2006.01)
(Continued)

(52) U.S. Cl.
CPC .......... *H04N 1/0306* (2013.01); *G02B 3/0037* (2013.01); *G02B 6/001* (2013.01);
(Continued)

(58) Field of Classification Search
CPC .. H04N 1/0306; H04N 1/028; H04N 1/02855; H04N 1/02885; H04N 1/04;
(Continued)

(56) References Cited

U.S. PATENT DOCUMENTS 7,591,576 B2 *  9/2009  Okamoto ........... H04N 1/02815
                                                    355/1
8,264,746 B2 *  9/2012  Tokida ............... H04N 1/40056
                                                    358/445
(Continued)

FOREIGN PATENT DOCUMENTS

JP        10-233890 A     9/1998
JP      2005-235759 A     9/2005
(Continued)

OTHER PUBLICATIONS

International Search Report dated Apr. 21, 2015, in PCT/JP2015/056236 filed Mar. 3, 2015.
(Continued)

*Primary Examiner* — Cheukfan Lee
(74) *Attorney, Agent, or Firm* — Oblon, McClelland, Maier & Neustadt, L.L.P.

(57) ABSTRACT

A lighting apparatus includes a first illumination portion and a second illumination portion. The first illumination portion and the second illumination portion respectively include a bar-like light guide whose shape of an end face of an end portion includes a part of a circle, an ellipse or a parabola, and light source elements that are provided to face the end face of the end portion of the light guide. In the light guide of the second illumination portion, light enters a determined range in which a focus of the shape of the end face of the end portion of the light guide is included. In the light guide of the first illumination portion, light enters a range that is not the
(Continued)

determined range in which the focus of the shape of the end face of the light guide is included.

8 Claims, 16 Drawing Sheets

(51) Int. Cl.
    *H04N 1/028*     (2006.01)
    *F21V 8/00*     (2006.01)
    *G02B 3/00*     (2006.01)
    *G02B 13/00*     (2006.01)
    *G03B 27/72*     (2006.01)
    *G03B 27/50*     (2006.01)
    *G03B 27/54*     (2006.01)

(52) U.S. Cl.
    CPC ....... *G02B 6/0006* (2013.01); *G02B 13/0095* (2013.01); *G03B 27/72* (2013.01); *H04N 1/028* (2013.01); *H04N 1/02855* (2013.01); *H04N 1/02885* (2013.01); *H04N 1/04* (2013.01); *G03B 27/50* (2013.01); *G03B 27/54* (2013.01); *H04N 2201/0081* (2013.01)

(58) Field of Classification Search
    CPC .......... H04N 2201/0081; G02B 3/0037; G02B 6/0006; G02B 6/001; G02B 13/0095; G03B 27/72; G03B 27/50; G03B 27/54
    See application file for complete search history.

(56) References Cited

U.S. PATENT DOCUMENTS

| | | | |
|---|---|---|---|
| 2005/0180165 A1 | 8/2005 | Sado et al. | |
| 2006/0158080 A1 | 7/2006 | Nakano et al. | |
| 2007/0248307 A1* | 10/2007 | Page | G02B 6/0035 385/123 |
| 2009/0109500 A1* | 4/2009 | Hasegawa | H04N 1/00681 358/474 |
| 2009/0219586 A1* | 9/2009 | Fujimoto | G02B 6/001 358/494 |
| 2010/0014315 A1* | 1/2010 | Fujimoto | G02B 6/001 362/615 |
| 2012/0154876 A1* | 6/2012 | Shimoda | H04N 1/00013 358/453 |
| 2013/0038912 A1* | 2/2013 | Horiguchi | H04N 1/02855 358/474 |
| 2013/0038913 A1* | 2/2013 | Shimoda | G07D 7/121 358/474 |
| 2013/0038914 A1* | 2/2013 | Yoshida | H04N 1/0285 358/474 |
| 2013/0100508 A1* | 4/2013 | Shimoda | G07D 7/121 358/509 |
| 2013/0258426 A1* | 10/2013 | Tsumekawa | G02B 6/0031 358/475 |
| 2013/0265617 A1* | 10/2013 | Murakami | G02B 6/0001 358/448 |
| 2014/0169656 A1* | 6/2014 | Shimoda | G02B 6/0001 382/135 |
| 2014/0286019 A1* | 9/2014 | Araki | G02B 19/0023 362/311.09 |
| 2014/0320937 A1* | 10/2014 | Horiguchi | H04N 1/02835 358/475 |
| 2014/0332667 A1 | 11/2014 | Aramaki et al. | |
| 2014/0355305 A1* | 12/2014 | Sakai | G02B 6/0011 362/612 |
| 2015/0015924 A1* | 1/2015 | Fujiuchi | H04N 1/02835 358/474 |
| 2015/0136951 A1* | 5/2015 | Ohama | H04N 1/02815 250/208.1 |
| 2015/0198758 A1* | 7/2015 | Yamamura | H04N 1/02835 358/474 |
| 2015/0249104 A1* | 9/2015 | Ota | G07D 7/121 250/208.1 |
| 2015/0381848 A1* | 12/2015 | Matsui | H04N 1/02835 358/482 |

FOREIGN PATENT DOCUMENTS

| | | |
|---|---|---|
| JP | 2006-228710 A | 8/2006 |
| JP | 2008-271009 A | 11/2008 |
| JP | 2009-65244 A | 3/2009 |
| JP | 2009-182399 A | 8/2009 |
| JP | 2012-204197 A | 10/2012 |
| WO | WO 2013/099836 A1 | 7/2013 |

OTHER PUBLICATIONS

Office Action dated Apr. 11, 2017 in Japanese Patent Application No. 2016-508648 (with partial English translation).
Office Action dated Nov. 28, 2017, in Japanese Patent Application No. 2016-508648 (with English-language translation).

* cited by examiner

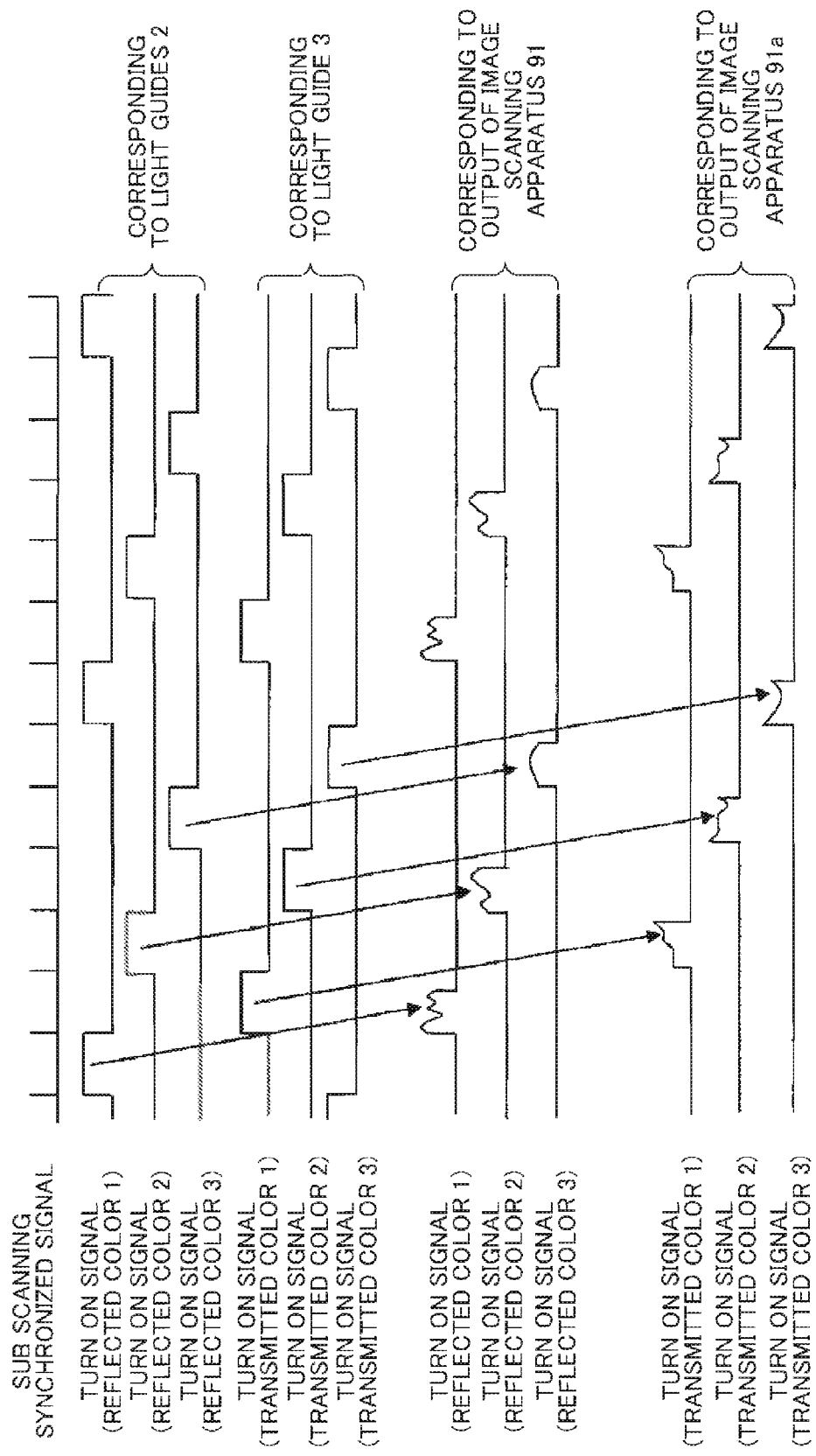

LIGHTING APPARATUS AND IMAGE READING APPARATUS

TECHNICAL FIELD

The present disclosure relates to a lighting apparatus using a light guide that emits incident light and an image scanning apparatus.

BACKGROUND ART

Image scanning apparatuses such as facsimiles, copying machines, and valuable paper reading devices irradiate light from a lighting apparatus to a document or a sheet of paper is a scanning object, cause reflected light and/or transmitted light thereof to image onto a photoelectric conversion element such as Complementary Metal-Oxide Semiconductor (CMOS) sensors or Charge-Coupled Device (CCD) sensors through an image formation element such as a lens or a mirror, and detect light information of the scanning object. In addition, image scanning apparatuses can copy a document, determine whether the sheet of paper is true or false, and determine the degree of deterioration during distribution, using image information generated from light information of the scanning object. In recent years, the miniaturization of image scanning apparatuses and speeding up of the reading speed require miniaturization and high efficiency of lighting apparatuses.

Patent Literature 1 describes a lighting apparatus in which light sources are arranged along the outer periphery of the cross section of the light guide for causing light to enter into the end portion of the light guide uniformly, and for causing light to emit efficiently to the outside.

Patent Literature 2 describes a highly efficient lighting apparatus in which light sources for emitting light in red, green and blue colors to the end portion of the light guide are arranged. The lighting apparatus can easily adjust emission colors by adjusting the amount of light emission from each light source.

Patent Literature 3 describes a lighting apparatus in which a light guide and an LED light source that transmits light in a main scanning direction are arranged. The lighting apparatus reduces its size by arranging a light blocking member in the vicinity of the light guide that emits light, and aims at uniformity in illuminance in the main scanning direction.

CITATION LIST

Patent Literature

Patent Literature 1: Unexamined Japanese Patent Application Kokai Publication No. 2009-182399
Patent Literature 2: Unexamined Japanese Patent Application Kokai Publication No. 2012-204197
Patent Literature 3: Unexamined Japanese Patent Application Kokai Publication No. H10-233890

SUMMARY OF INVENTION

Technical Problem

However, the light guides described in Patent Literatures 1 to 3 are required to control the flux of emitted light according to the shape of the light guide. Each of the lighting apparatuses described in Patent Literatures 1 to 3 require a light guide for reflected illumination that emits light flux spreading to a certain degree and a light guide for transmitted illumination that emits light flux as approximately parallel light, causing problems of increasing the number of component parts and of making the lighting apparatuses complex.

The present disclosure is accomplished considering the above-mentioned circumstances. The objective thereof is to simplify a lighting apparatus having reflected illumination and transmitted illumination by forming reflected illumination and transmitted illumination by using the same type of light guides and by reducing the number of types of parts.

Solution to Problem

In order to achieve the objective mentioned above, the lighting apparatus according to the present disclosure comprises a first illumination portion and a second illumination portion, each having a bar-like light guide that includes a peripheral-shaped end face that includes at least a part of a circle, an ellipse or a parabola, and light source elements that are provided to face an end face of the light guide. In the light guide of the second illumination portion, light enters the determined range in which a focus of a circle, an ellipse or a parabola included in the shape of the end face of the light guide is included. In the light guide of the first illumination portion, light enters a range that is not the determined range in which a focus of a circle, an ellipse or a parabola included in the shape of the end face of the end portion of the light guide is included.

Advantageous Effects of Invention

According to the present disclosure, just one type of light guide can realize reflected illumination and transmitted illumination by changing the condition of the incident position of the light entering the light guide. Therefore, lighting apparatuses equipped with reflected illumination and transmitted illumination can be simplified.

BRIEF DESCRIPTION OF DRAWINGS

FIG. 10 is a chart illustrating operation timing of an image scanning apparatus;

DESCRIPTION OF EMBODIMENTS

Embodiment 1.

Figure 1:
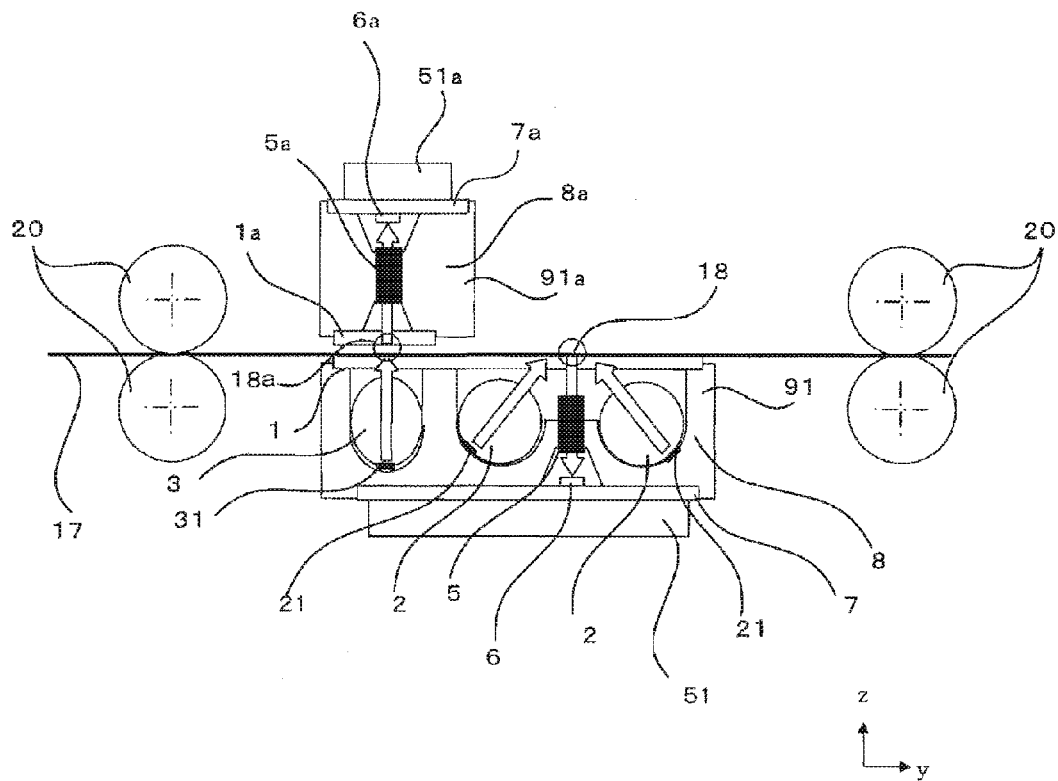
FIG. 1 is a cross section of an image scanning apparatus according to Embodiment 1 of the present disclosure.
Figure 2:
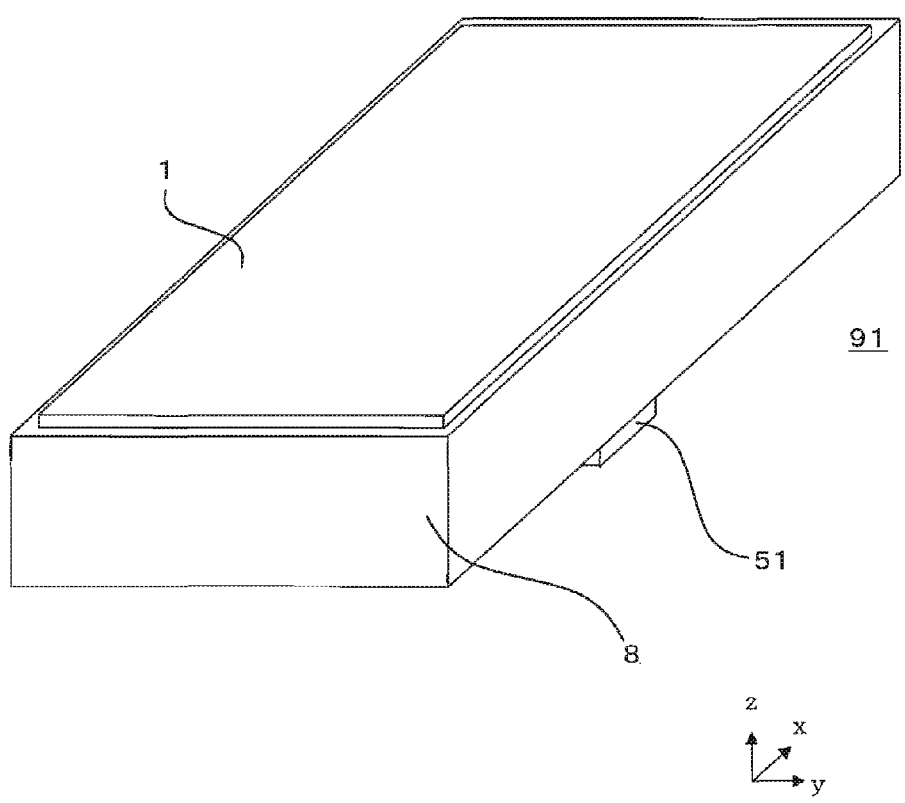
FIG. 2 is a perspective view of the image scanning apparatus having a lighting apparatus according to Embodiment 1.
Figure 3:
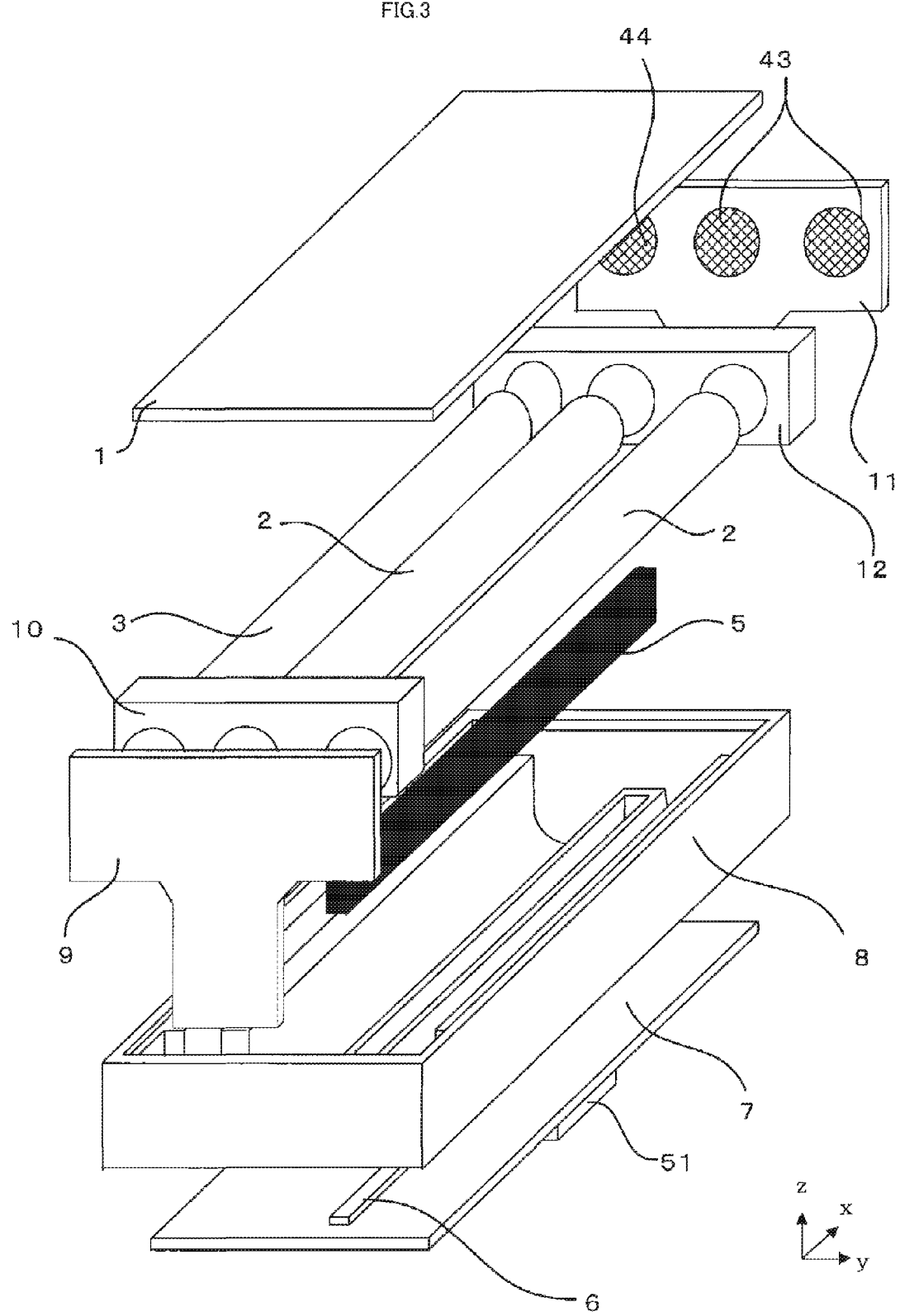
FIG. 3 is an exploded view of the image scanning apparatus having a lighting apparatus according to Embodiment 1.

FIG. 1 is a cross section of an image scanning apparatus according to Embodiment 1 of the present disclosure. FIG. 2 is a perspective view of the image scanning apparatuses having a lighting apparatus according to Embodiment 1. FIG. 3 is an exploded view of the image scanning apparatuses having a lighting apparatus according to Embodiment 1. A sheet of paper 7 is a scanning object outside the image scanning apparatuses. The sheet of paper 17 is a sheet of valuable paper such as a bank note, securities, a check and the like.

The sheet of paper 17 is conveyed on a top glass 1 to the left and right direction (y direction) of FIG. 1 by rollers 20 disposed upstream side and downstream side in the conveyance direction. Hereinafter, the right and left direction (y direction) of FIG. 1 is referred to as the sub-scanning direction, and the up and down direction (z direction) is referred to as the depth direction. In addition, as illustrated in FIG. 2 and FIG. 3, a direction (x direction) that is perpendicular o a plane defined by the right and left direction (y direction) and the up and down direction (z direction) is referred to as the main scanning direction. In addition, the x direction, the y direction and the z direction described in each figure are the main scanning direction, the sub-scanning direction and the depth direction respectively. Reading of an image of the sheet of paper 17 is realized by operating the image scanning apparatus and scanning while conveying the sheet of paper 17 at a constant speed.

The image scanning apparatus of the present embodiment includes an image scanning apparatus 91 that has a lighting apparatus and receives reflected light, and an image scanning apparatus 91a that receives transmitted light. The image scanning apparatus 91 includes a top glass 1, light guides 2 for reflected illumination that irradiates a reading area 18 over the top glass 1, a light guide 3 for transmitted illumination that irradiates a reading area 18a, and a light scattering portion 21 and a light scattering portion 31 each of which are disposed linearly along the main scanning direction on each of the inner surfaces of the light guides 2 and the light guide 3. In addition, the image scanning apparatus 91 includes a rod lens array 5 imaging the reflected light from the sheet of paper 17 on the reading area 18, and a photoelectric conversion element array (sensor IC) 6 that converts the light information imaged by the rod lens array 5 into an electric signal. Furthermore, the image scanning apparatus 91 includes a printed circuit board 7 mounting the photoelectric conversion element array 6, a signal processor 51 mounted on the printed circuit board 7 and a housing 8 to hold these parts.

The image scanning apparatus 91a includes a top glass 1a, a rod lens array 5a imaging the transmitted light from the sheet of paper 7 on the reading area 18a, and a photoelectric conversion element array (sensor IC) 6a that converts the light information imaged by the rod lens array 5a into an electric signal. Furthermore, the image scanning apparatus 91a includes a printed circuit board 7a mounting the photoelectric conversion element array 6a, a signal processor 51a mounted on the printed circuit board 7a and a housing 8a to hold these parts As illustrated in FIG. 3, holders 10 and 12 hold a flexible printed circuit board 9 and a flexible printed circuit board 11 mounting light sources, light guides 2 and the light guide 3. Light sources are mounted in an area 43 and an area 44 of the flexible printed circuit board 11. Similarly, the flexible printed circuit board 9 has a mounting assembling area of a light source. Here, as the light guides 2 and the light guide 3, an example of a bar-like light guide whose end face shape of the end portion in the longitudinal direction is a circle or an ellipse is described. However, not limited to this example, the bar-like light guide may be a light guide whose end face shape of the end portion in the longitudinal direction includes a part of a circle, an ellipse or a parabola. This also applies to other embodiments.

Figure 4:
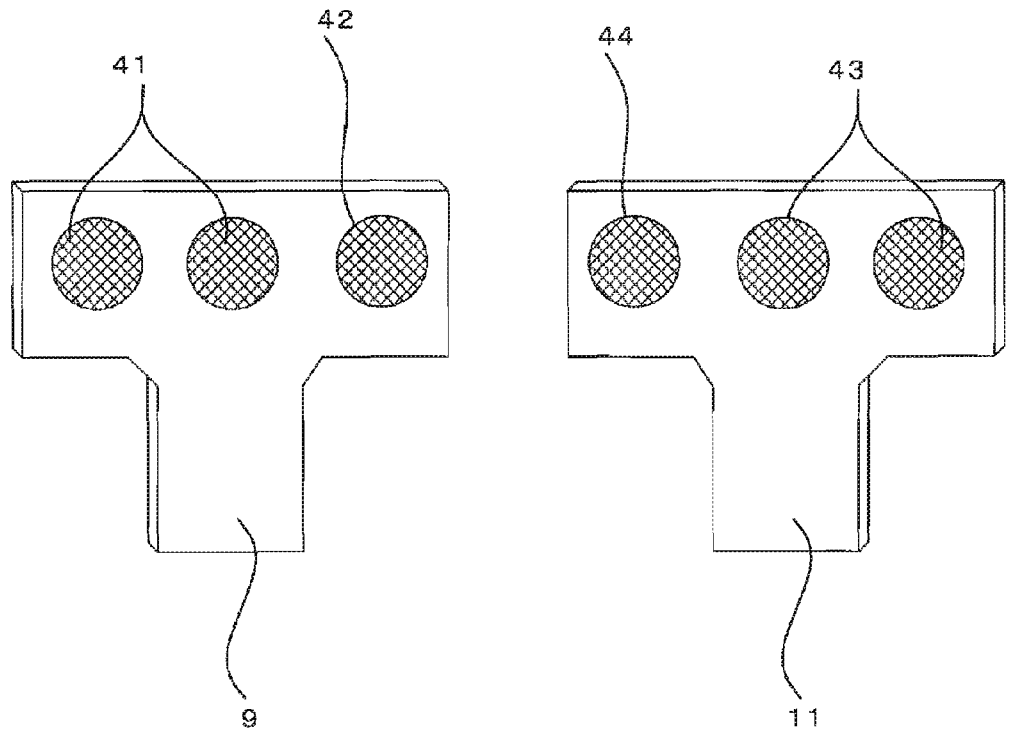
FIG. 4 is an illustration illustrating a flexible printed circuit board according to Embodiment 1.

FIG. 4 is an illustration illustrating a flexible printed circuit board according to Embodiment 1. Light sources 4 (not illustrated) are mounted in an area 41 and an area 42 of the flexible printed circuit board 9 and in the area 43 and the area 44 of the flexible printed circuit board 11. The area 42 and the area 44 correspond to the light guide 3 and the area 41 and the area 43 correspond to the light guides 2. The light sources 4 are mounted so that the optical axis thereof faces the axial direction of the light guides 2 and the light guide 3. In addition, the wavelength of the emitted light of the light sources 4 is in a wavelength range in which the aforementioned photoelectric conversion element array 6 is sensitive. In accordance with detection specifications, one type or a plurality of types of light sources 4 having different wavelengths from one another are mounted. The light sources 4 are controllably turned on/off by the signal processor 51 (not illustrated) via the flexible printed circuit boards 9 and 11 for each type.

Figure 5:
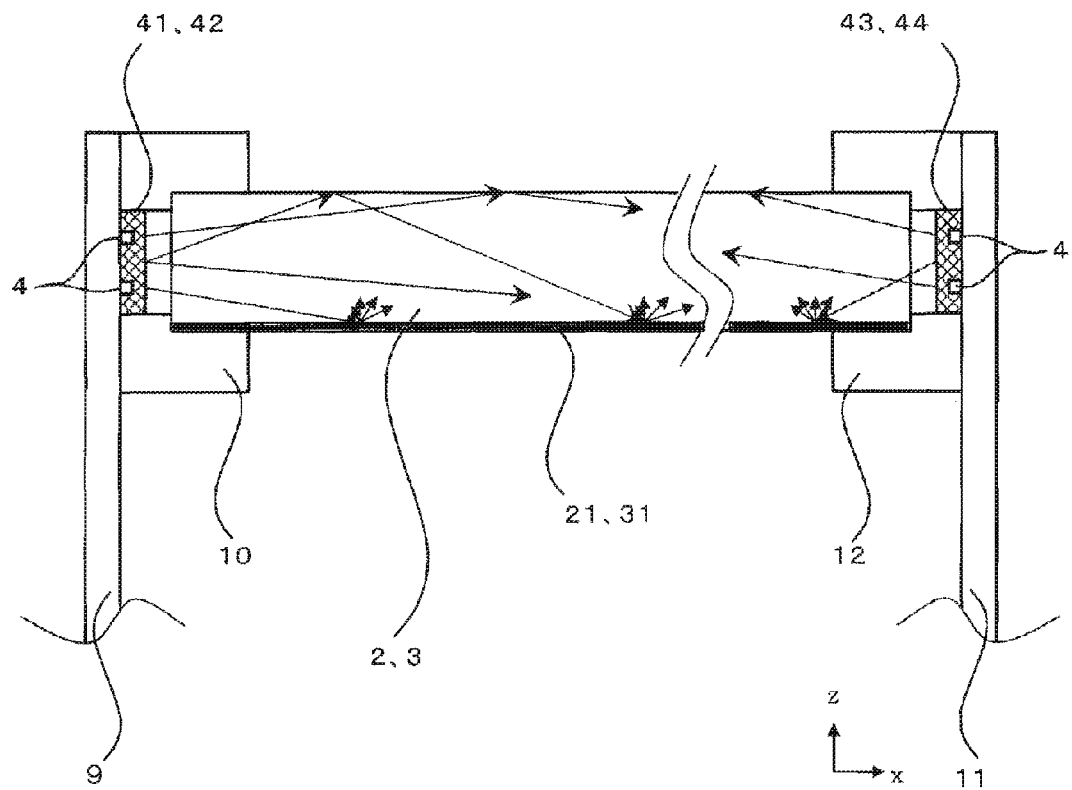
FIG. 5 is a side cross section of the lighting apparatus included in the image scanning apparatus according to Embodiment 1.

FIG. 5 is a side cross section of the lighting apparatus included in the image scanning apparatus according to Embodiment 1. The lighting apparatus included in the image scanning apparatus 91 includes the light sources 4, the light guides 2, the light guide 3, the flexible printed circuit board 9 and the flexible printed circuit board 11 in which the light sources 4 are mounted, the holder 10 and the holder 12. The holder 10 is disposed between the light guides 2 and the light guide 3 and the flexible printed circuit board 9. The holder 12 is disposed between the light guides 2 and the light guide 3 and the flexible printed circuit board 11. The holder 10 and the holder 12 retain the light guides 2, the light guide 3, the flexible printed circuit board 9 and the flexible printed circuit board 11. The light sources 4 may be anything that emits light, such as an LED, an organic electroluminescence, a lamp, a laser light source and the like.

In this lighting apparatus, at least the light guides 2 and the light sources 4 facing the end portion of the light guides 2 form a first illumination portion (illumination portion for reflected light), and at least the light guide 3 and the light sources 4 facing the end portion of the light guide 3 form a second illumination portion (illumination portion for transmitted light).

As illustrated in FIG. 5, the light guides 2 and the light guide 3 are retained to come close to the light sources by the holder 10 and the holder 12 respectively. Light emitted from the light sources 4 mounted on the flexible printed circuit board 9 and the flexible printed circuit board 11 enters the light guides 2 and the light guide 3 from the end faces of the end portions of the light guides 2 and the light guide 3. Parts of the incident light scatter at the light scattering portion 21 and the light scattering portion 31 as the incident light advances while reflecting entirely on the inner surface of the light guides 2 and the light guide 3.

Figure 6A:
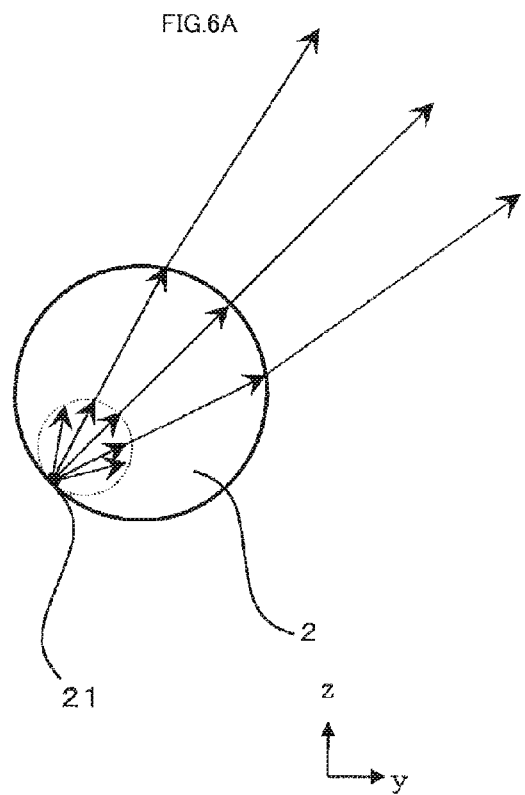
FIG. 6A is an illustration illustrating light flux suitable for reflected illumination.
Figure 6B:
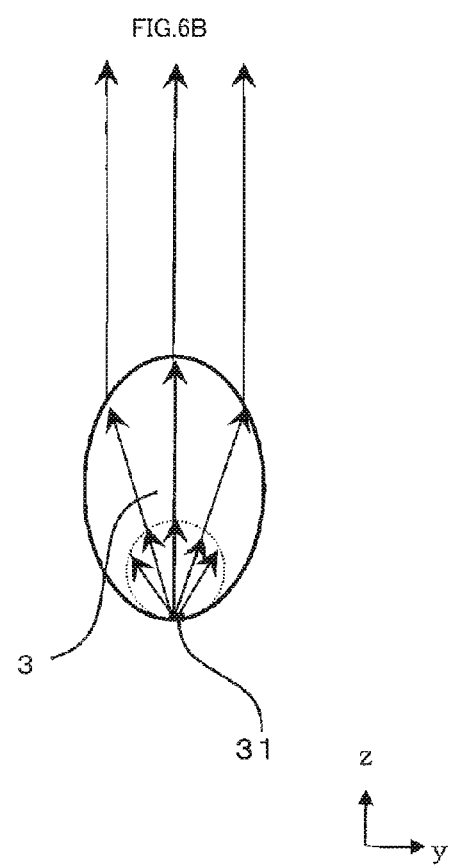
FIG. 6B is an illustration illustrating light flux suitable for transmitted illumination.

FIG. 6A is an illustration illustrating light flux suitable for reflected illumination. FIG. 6B is an illustration illustrating light flux suitable for transmitted illumination. FIG. 6A illustrates an example of the light guide 2 whose cross section is a circle. FIG. 6B illustrates an example of the light guide 3 whose cross section is an ellipse. As illustrated in FIG. 6A and FIG. 6B, according to the law of reflection of light, the light, scattered at the light scattering portion 21 and the light scattering portion 31, is radiated in a direction opposite to the light scattering portion 21 and the light scattering portion 31 with respect to the cross sectional center while acquiring a constant light condensing effect. The light emitted the light guide 2 and the light guide 3 illuminates the sheet of paper 17.

Figure 7A:
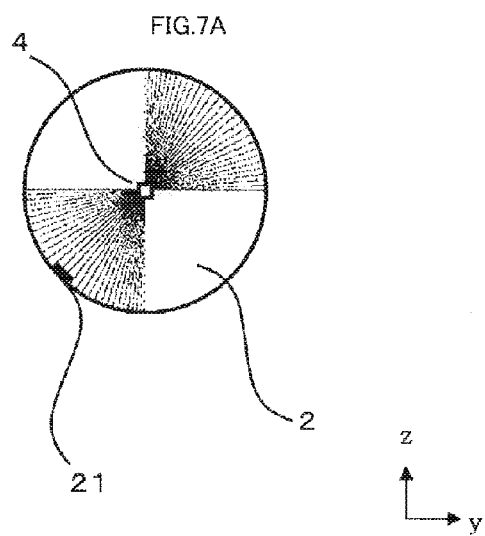
FIG. 7A is an illustration of light beams advancing while totally reflecting on an inner surface of the light guide viewed from the end face of the end portion of the light guide in the main scanning direction when a light source is disposed at the center of the end face of the end portion of the light guide.
Figure 7B:
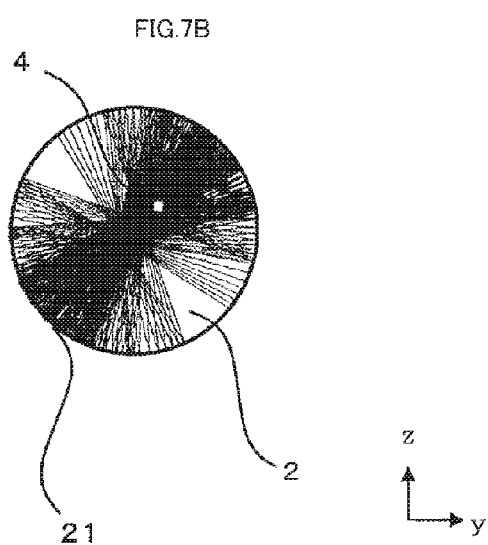
FIG. 7B is an illustration of light beams advancing while totally reflecting on an inner surface of the light guide viewed from the end face of the end portion of the light guide in the main scanning direction when a light source is disposed at a position slightly closer to the outer periphery than to the center of the end face of the end portion of the light guide.
Figure 7C:
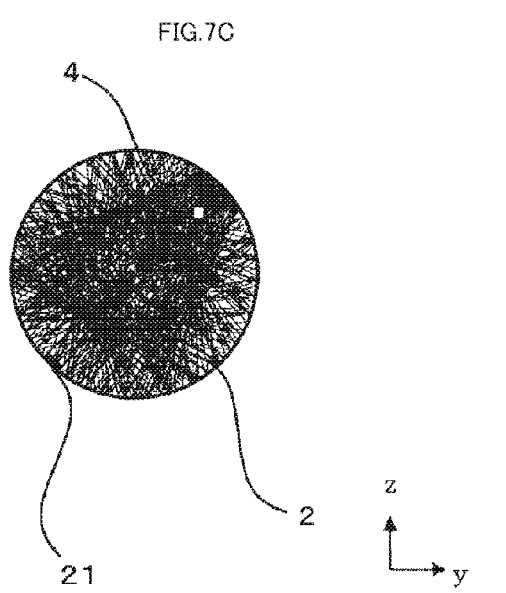
FIG. 7C is an illustration of light beams advancing while totally reflecting on an inner surface of the light guide viewed from the end face of the end portion of the light guide in the main scanning direction when a light source is disposed at a position that is almost on the outer periphery of the end face of the end portion of the light guide.

FIG. 7A is an illustration of light beams advancing while totally reflecting on an inner surface of the light guide viewed from the end face of the end portion of the light guide in the main scanning direction when a light source is disposed at the center of the end face of the end portion of the light guide. FIG. 7B is an illustration of light beams advancing while totally reflecting on an inner surface of the light guide viewed from the end face of the end portion of the light guide in the main scanning direction when a light source is disposed at a position slightly closer to the outer periphery than to the center of the end face of the end portion of the light guide. FIG. 7C is an illustration of light beams advancing while totally reflecting on an inner surface of the light guide viewed from the end face of the end portion of the light guide in the main scanning direction when a light source is disposed at a position that is almost on the outer periphery of the end face of the end portion of the light guide. FIGS. 7A to 7C illustrate an example of the light guide 2 whose end face of the end portion is a circle. The focus of a circle is the center of the circle, and light emitted from the center of a circle is characterized to return to the center when the light is reflected at the circumference of a circle. Therefore when the light sources 4 that are close to a point light source are disposed at the focus as illustrated in FIG. 7A, the light advances while totally reflecting in the light guide 2. However, if viewed from the end face of the end portion of the light guide in the main scanning direction, the light solely repeats reflecting in a specified area on the circumference on a side surface of the light guide.

Therefore, the angle of light entering the light scattering portion 21 becomes zero degrees in the short-length direction and light emitted from the light guide 2 does not spread in the sub-scanning direction and is irradiated onto the sheet of paper 17 in a state of nearly parallel light suitable for transmitted illumination. In contrast, as illustrated in FIG. 7B or FIG. 7C, as the distance between the outer periphery of the light guide 2 and the mounting position of the light sources 4 decreases, the light begins to enter at various angles in the short-length direction of the light scattering portion 21. Thus, the light emitted from the light guide 2 spreads in the sub-scanning direction and is emitted in light flux suitable for reflected illumination.

Figure 8A:
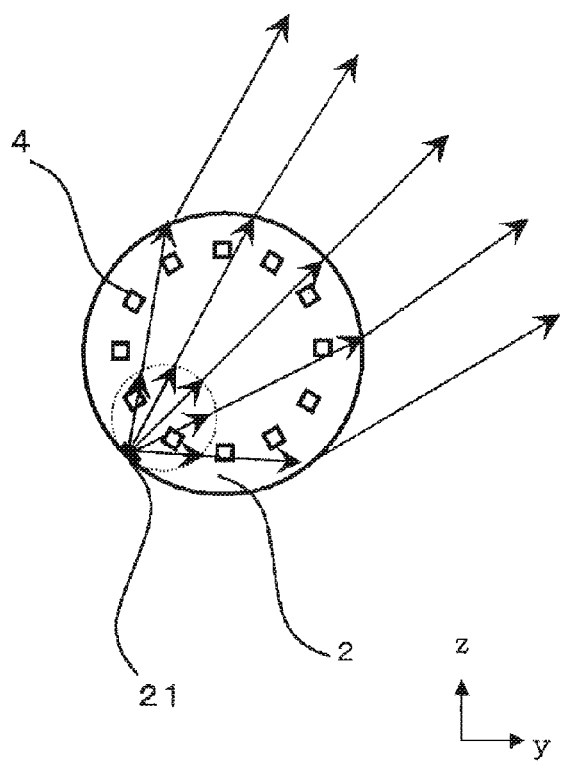
FIG. 8A is an illustration illustrating light flux emitted from the light guide when a light source is disposed on a circumference that is close to the outer periphery of the end face of the end portion of the light guide where the shape of the end face of the end portion is a circle.
Figure 8B:
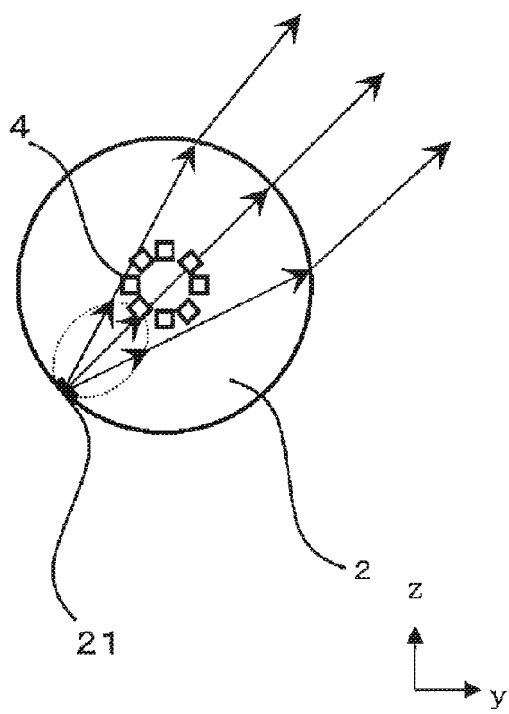
FIG. 8B is an illustration illustrating light flux emitted from the light guide when a light source is disposed on a circumference that is close to the focus of the end face of the end portion of the light guide where the shape of the end face of the end portion is a circle.

FIG. 8A is an illustration illustrating light flux emitted from the light guide when a light source is disposed on a circumference that is close to the outer periphery of the end face of the end portion of the light guide where the shape of the end face of the end portion is a circle. FIG. 8B is an illustration illustrating light flux emitted from the light guide when a light source is disposed on a circumference that is close to the focus of the end face of the end portion of the light guide where the shape of the end face of the end portion is a circle. FIG. 8A and FIG. 8B illustrate an example of the light guide 2 whose close-section is a circle. As illustrated in FIG. 8A, when the light sources 4 are disposed along a circumference close to the outer periphery of the shape of the end face of the end portion of the light guide 2, the light emitted from the light guide 2 becomes light flux suitable for reflected illumination. As illustrated in FIG. 8B, when the light sources 4 are disposed along a circumference close to the focus (the center) of the shape of the end face of the end portion of the light guide 2, the light emitted from the light guide 2 becomes nearly parallel light flux suitable for transmitted illumination. However, as the distance between the outer periphery of the light guide 2 and the mounting position of the light sources 4 decreases, the light emitted from the light guide 2 spreads in the sub-scanning direction. Thus the illuminance on the sheet of paper 17 decreases. Thus, assembling likelihood and illuminance of the light guide 2 are in a trade-off relationship. Therefore, it is necessary to dispose the light sources 4 within a setting radius that satisfies illuminance and assembling likelihood necessary for image reading.

Therefore, in the image scanning apparatus 91 illustrated in FIG. 1, when light guides whose shape of the end face of the end portion are identical are used for the light guides 2 and the light guide 3, and the light sources 4 are disposed along a circumference close to the outer periphery of the shape of the end face of the end portion of the light guides 2, the light emitted from the light guides 2 becomes light flux suitable for reflected illumination. When the light sources 4 are disposed along a circumference close to the focus (the center) of the shape of the end face of the end portion of the light guide 3, the light becomes light flux that is nearly parallel light suitable for transmitted illumination. That is, one can acquire light flux suitable for reflected illumination and light flux that is nearly parallel light suitable for transmitted illumination by varying arrangements of the light sources 4 using light guides having the same end face shape.

In FIG. 1, the light guides 2 of the image scanning apparatus 91 are disposed at a position where light emitted by the light scattering portion 21 can efficiently illuminate the reading area 18 at a diagonal angle of about 45 degrees.

Figure 9A:
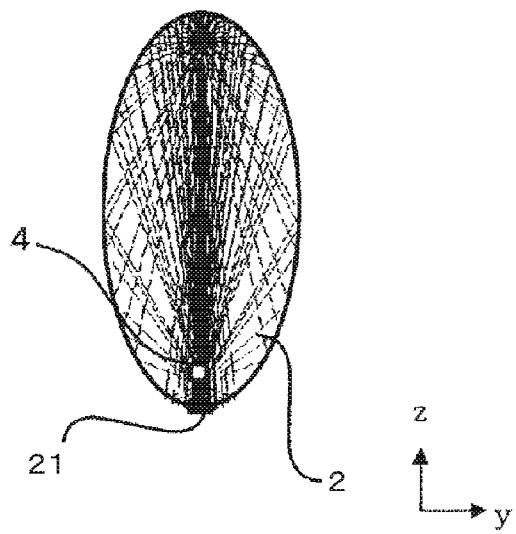
FIG. 9A is an illustration of light beams advancing while totally reflecting on an inner surface of the light guide viewed from the end face of the end portion of the light guide in the main scanning direction when a light source is disposed at a position of one focus of two focuses of an ellipse.
Figure 9B:
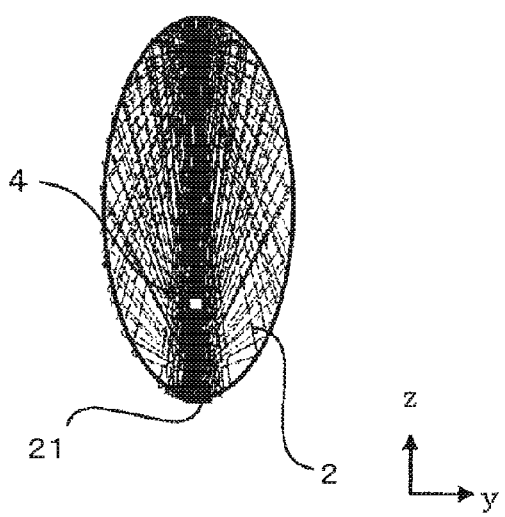
FIG. 9B is an illustration of light beams advancing while totally reflecting on an inner surface of the light guide viewed from the end face of the end portion of the light guide in the main scanning direction when a light source is disposed at a position slightly away from the focus towards the center of the ellipse.
Figure 9C:
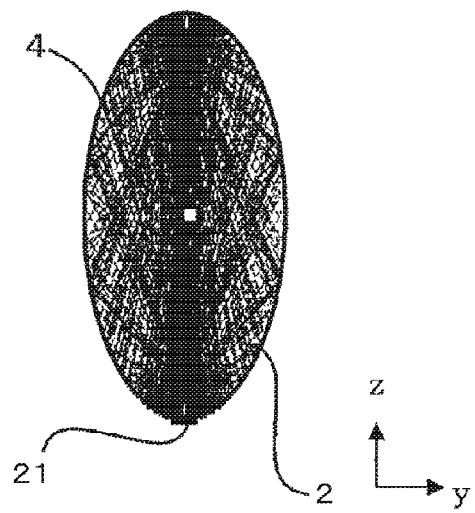
FIG. 9C is an illustration when a light source is disposed approximately at the center of the ellipse.

FIG. 9A is an illustration of light beams advancing while totally reflecting on an inner surface of the light guide viewed from the end face of the end portion of the light guide in the main scanning direction when a light source is disposed at a position of one focus of two focuses of an ellipse. FIG. 9B is an illustration of light beams advancing while totally reflecting on an inner surface of the light guide viewed from the end face of the end portion of the light guide in the main scanning direction when a light source is disposed at a position slightly away from the focus towards the center of the ellipse. FIG. 9C is an illustration when a light source is disposed approximately at the center of the ellipse. FIGS. 9A to 9C illustrate an example of the light guide 2 whose end face of the end portion is an ellipse. Also in a case in which the end face of the end portion of the light guide is an ellipse, similar to the case in which the end face of the end portion of the light guide is a circle, the incident angle of light flux in the short-length direction of the light scattering portion 21 is limited by the arrangement of the light sources 4 at a position close to a focus, and the light flux is irradiated on the sheet of paper 17 forming nearly parallel light flux. The light flux is spread and irradiated on the sheet of paper 17 by arranging the light sources 4 in a position away from the focus. In this way, even in the case in which the end face of the end portion is an ellipse, similar to the case in which the end face of the end portion of the light guide is a circle, an emitting angle of light flux emitted from the light guide can be adjusted by the arranged position of the light sources 4 with respect to the focus.

Using the above-mentioned configuration, the photoelectric conversion element array 6 of the image scanning apparatus 91 can receive reflected light from the sheet of paper 17 on the reading area 18 illuminated by the light guides 2 of the image scanning apparatus 91. The photoelectric conversion element array 6a of the image scanning apparatus 91a can receive transmitted light from the sheet of paper 17 on the reading area 18a illuminated by the light guide 3 of the image scanning apparatus 91. The light information on the reflected light and the transmitted light can be output to the outside via the signal processor 51.

In addition, the photoelectric conversion element array 6 and the photoelectric conversion element array 6a output an electrical signal proportional to a convolution integral value of the sensitivity spectrums of the photoelectric conversion element array 6 and the photoelectric conversion element array 6a and the spectrums of the reflected light and the transmitted light received by the photoelectric conversion element array 6 and the photoelectric conversion element array 6a. The sensitivity spectrums of the photoelectric conversion element array 6 and the photoelectric conversion element array 6a are values fixed for each device. Therefore, light information of the reflected light and the transmitted light of different spectrums can be acquired by scanning while changing illumination having different emission spectrums to each other. Next, a relationship between the lighting timing of the light sources and the output of the image scanning apparatus is explained.

FIG. 10 is a chart illustrating operation timing of an image scanning apparatus. Here, a case in which the light sources having three types of single wavelengths in total are implemented as light sources corresponding to the light guides 2 and the light guide 3. Outputs of the photoelectric conversion element array 6 and the photoelectric conversion element array 6a synchronizing with a scanning signal and corresponding to types of light sources can be acquired in chronological order by sequentially and repeatedly turning on and off while total three types of light sources are synchronized with the scanning signal.

In this way, light information of the reflected light corresponding to the illumination wavelength of the light sources 4 can be acquired from the sheet of paper 17 on the reading area 18, for example, at a time of turning on the light sources 4 by controlling and synchronizing the image scanning apparatus 91. Similarly, light information of the transmitted light from the sheet of paper 17 on the reading area 18a corresponding to the illumination wavelength of the light sources 4 can be acquired, for example, at a time of turning on the light sources 4. In addition, it is possible to read color information without shifting operation timing as illustrated in FIG. 10 by arranging in the sub-scanning direction sensor ICs that have red, green, blue and the like color filters disposed respectively and that extend in the main scanning direction. Here is illustrated an example in which light sources 4 having three types of different wavelengths are disposed in the image scanning apparatus 91, however, types of wavelengths are not limited to this.

Figure 11:
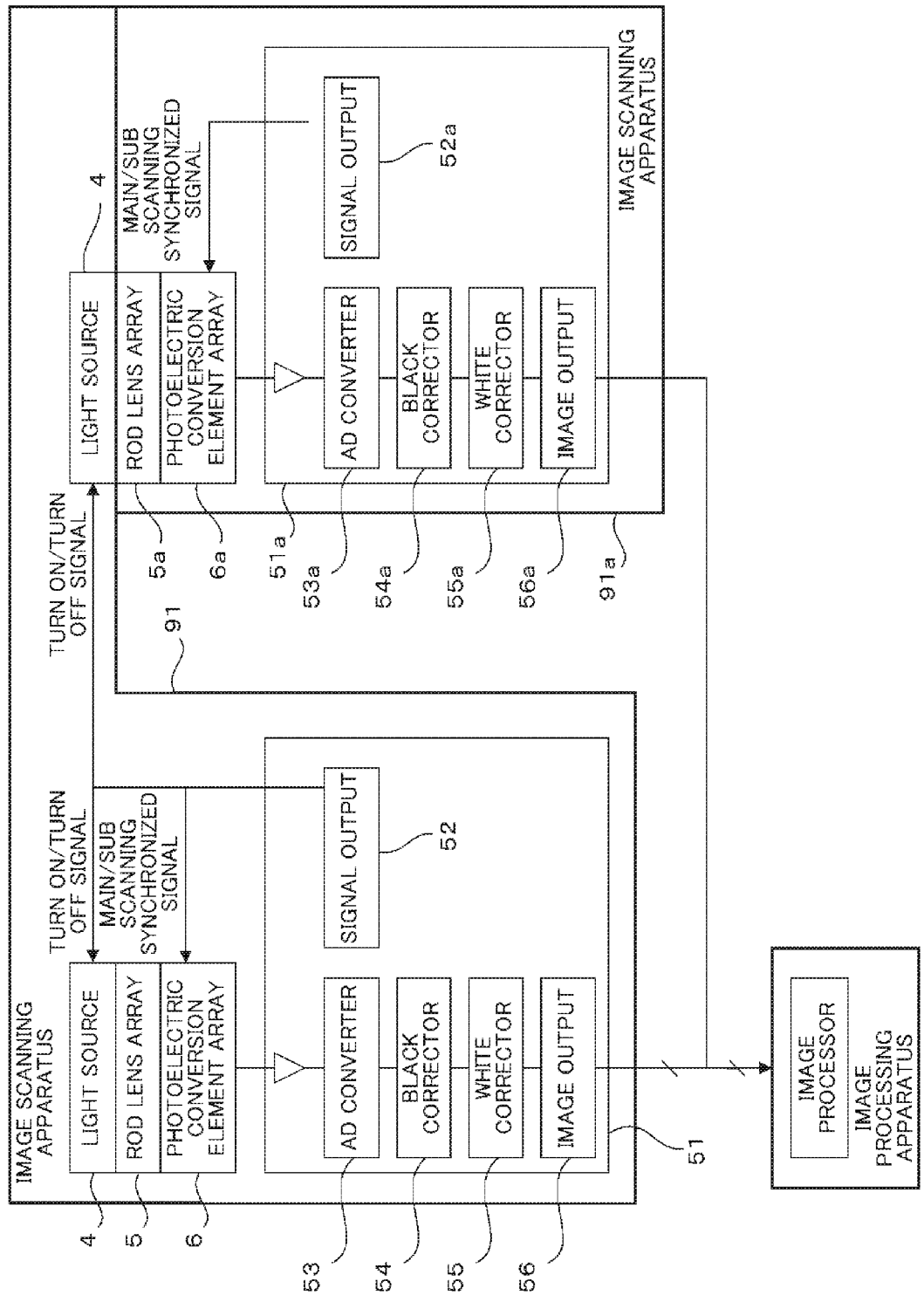
FIG. 11 is an entire block diagram of the image scanning apparatus according to Embodiment 1.

FIG. 11 is an entire block diagram of the image scanning apparatus according to Embodiment 1. The signal processor 51 of the image scanning apparatus 91 includes, as functional components, a signal output 52, an Analog-to-Digital (AD) converter 53, a black corrector 54, a white corrector 55 and an image output 56. A control program executes processes of the signal output 52, the AD converter 53, the black corrector 54, the white corrector 55 and the image output 56 using hardware such as an Analog-to-Digital (AD) converter, a Central Processing Unit (CPU), memories and the like as resources.

The signal output 52 sends a turn-on signal and a turn-off signal to each of the light sources 4. In addition, the signal output 52 sends a main scanning synchronization signal and a sub-scanning synchronization signal to the photoelectric conversion element array 6. The AD converter 53 digitally converts an electrical signal output from the photoelectric conversion element array 6.

The black corrector 54 executes a black correction process for the electrical signal digitally converted by the AD converter 53 (hereinafter, referred to as the image information). In the black correction process, the image information is digitally calculated to homogenize the black output heterogeneous character of the photoelectric conversion element array 6. The white corrector 55 executes a white correction process in which image information processed in the black correction process is digitally calculated to homogenize the sensitivity heterogeneous character of the photoelectric conversion element array 6 and to homogenize the output heterogeneous character due to the illumination system and/or the image formation system. The image output 56 outputs the image information processed in these processes to the outside.

In the example of FIG. 11, the image output 56 transmits image information to the outside image processing device having an image processor. The image processor, for example, performs copying of a document, determination of true or false of sheets of paper and/or determination of the degree of deterioration during distribution utilizing received image information. In addition, the image processor may be included in the image scanning apparatus 91.

The signal processor I a of the image scanning apparatus 91a similarly includes a signal output 52a, an AD converter 53a, a black corrector 54a, a white corrector 55a and an image output 56a as functional components.

As mentioned above, the image scanning apparatus according to this Embodiment 1 can realize reflected illumination and transmitted illumination in one type of light guide by changing the conditions of incidence positions of light by arranging light sources. At which the light enters a light guide at the incidence positions of light. Thus, a lighting apparatus having reflected illumination and transmitted illumination can be simplified. Specifically, illuminance distribution on the sheet of paper 17 becomes suitable for transmitted illumination by arranging the light sources 4 in the determined range that includes a focus of a circle, an ellipse or a parabola included in the shape of the end face of the end portion of the light guide 3. Illuminance distribution on the sheet of paper 17 becomes suitable for reflected illumination by arranging the light sources 4 in a range that is not the determined range that includes a focus of a circle, an ellipse or a parabola included in the shape of the end face of the end portion of the light guides 2. Therefore, reflected illumination and transmitted illumination can be performed in the same light guide.

In addition, an example is described in which arrangement of the light sources 4 spreads the light flux of reflected illumination and focuses the light flux of transmitted illumination. However, the light sources 4 may be arranged near the focus of the light guide to focus the light flux when the light focusing ability of the light guide of reflected illumination is weak. Similarly, the light sources 4 may be disposed away from the focus to spread the light flux when light focusing ability of the transmitted illumination is too strong.

Embodiment 2.

In the Embodiment 1, arrangement of the light sources 4 limits an area in which light enters from the light incidence plane of the light guides 2 and the light guide 3. However, the light amount necessary for reading images can be insufficient when there is a limit in the number of light sources 4 that can be arranged along a circumference of the shape of the end face of the end portion of the light guide as in Embodiment 1 and when the light sources 4 having a plurality of colors are disposed.

Therefore, in Embodiment 2, a light blocking portion is set in a holder maintaining the light guides 2 and the light guide 3. This can limit the area where light enters from the light incidence plane of the light guides 2 and the light guide 3 regardless of the arrangement positions of the light sources 4.

Figure 12:
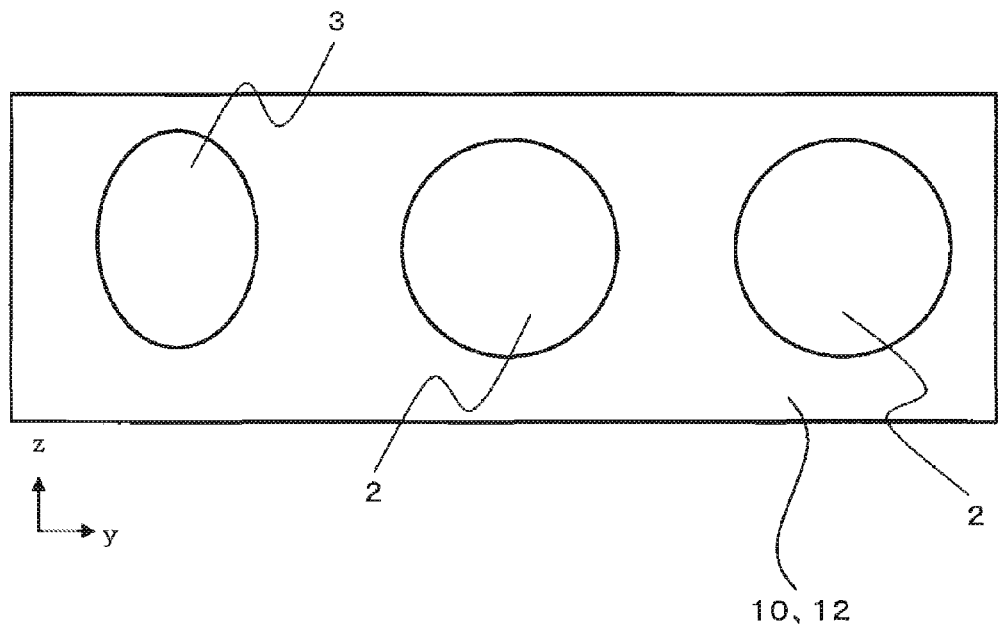
FIG. 12 is an illustration illustrating a state in which a holder with no light blocking portion is assembled in the light guide according to Embodiment 1 from the main scanning direction.

FIG. 12 is an illustration illustrating a state in which a holder with no light blocking portion is assembled in the light guide according to Embodiment 1 from the main scanning direction. The holder 10 and the holder 12 with no light blocking portion are assembled in the light guides 2 and the light guide 3 from the main scanning direction.

Figure 13:
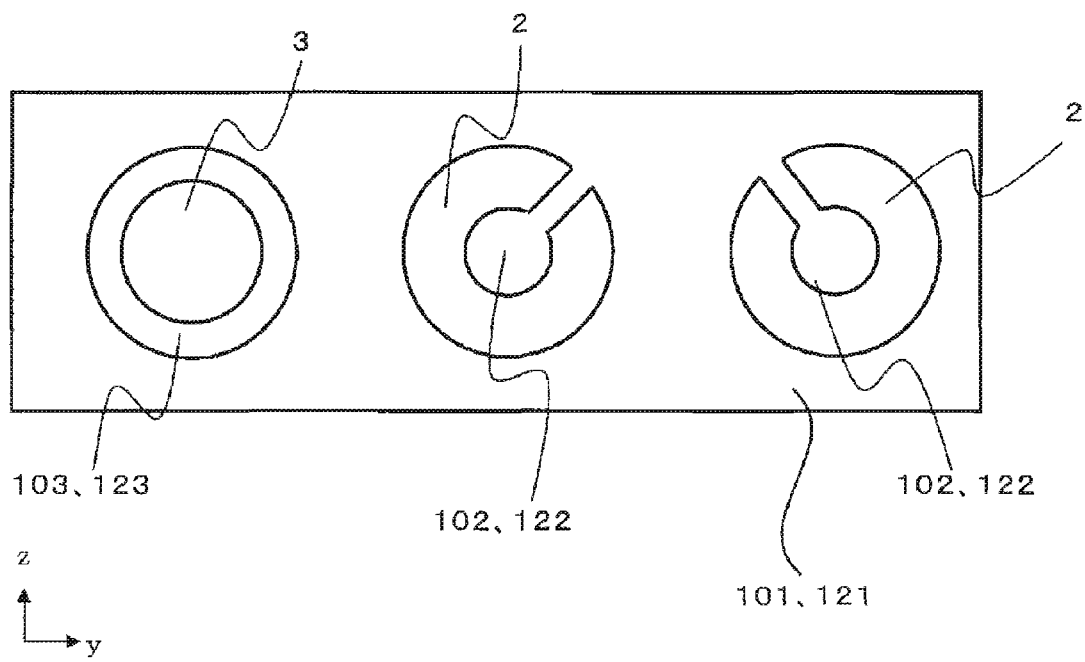
FIG. 13 is an illustration illustrating a state in which a holder having a light blocking portion is assembled in the light guide according to Embodiment 2 of the present disclosure from the main scanning direction.

FIG. 13 is an illustration illustrating a state in which a holder having a light blocking portion is assembled in the light guide according to Embodiment 2 of the present disclosure from the main scanning direction. The light guides 2 and the light guide 3 are formed of the same light guide (the same shape of the end face of the end portion) and FIG. 13 illustrates a light guide whose shape of the end face of the end portion is a circle. The light blocking portion 102 and the light blocking portion 122 are arranged in the holder 101 and the holder 121 so that light does not enter the determined range in which focuses of the shape of the end face of the end portion of the light guides 2 are included, and the light blocking portion 103 and the light blocking portion 123 are arranged in the holder 101 and the holder 121 so that light does not enter a range that is not the determined range in which a focus of the shape of the end face of the end portion of the light guide 3 is included. The holder 101 and the holder 121 are assembled in the main scanning direction.

Figure 14:
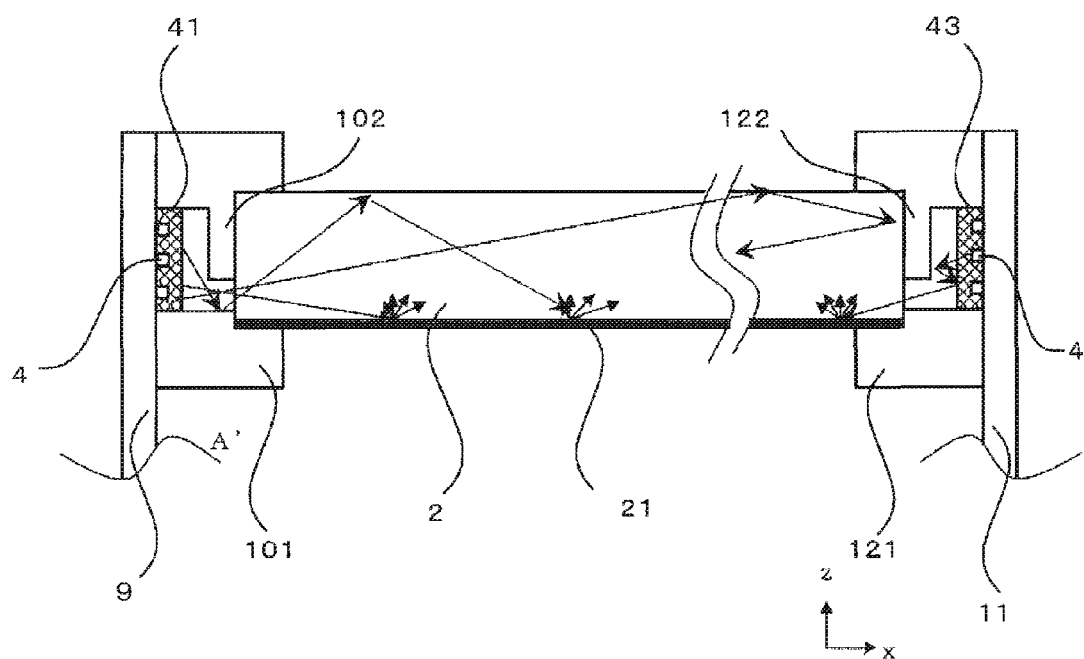
FIG. 14 is an illustration illustrating the transmission of light in the light guide for reflected illumination in a state in which a light blocking portion is added to the holder of Embodiment 2.

FIG. 14 is an illustration illustrating the transmission of light in the light guide for reflected illumination in a state in which a light blocking portion is added to the holder of Embodiment 2. The light transmits in the light guides 2 as illustrated in FIG. 14 in a state in which the holder 101 and the holder 121 are assembled as illustrated in FIG. 13.

Figure 15:
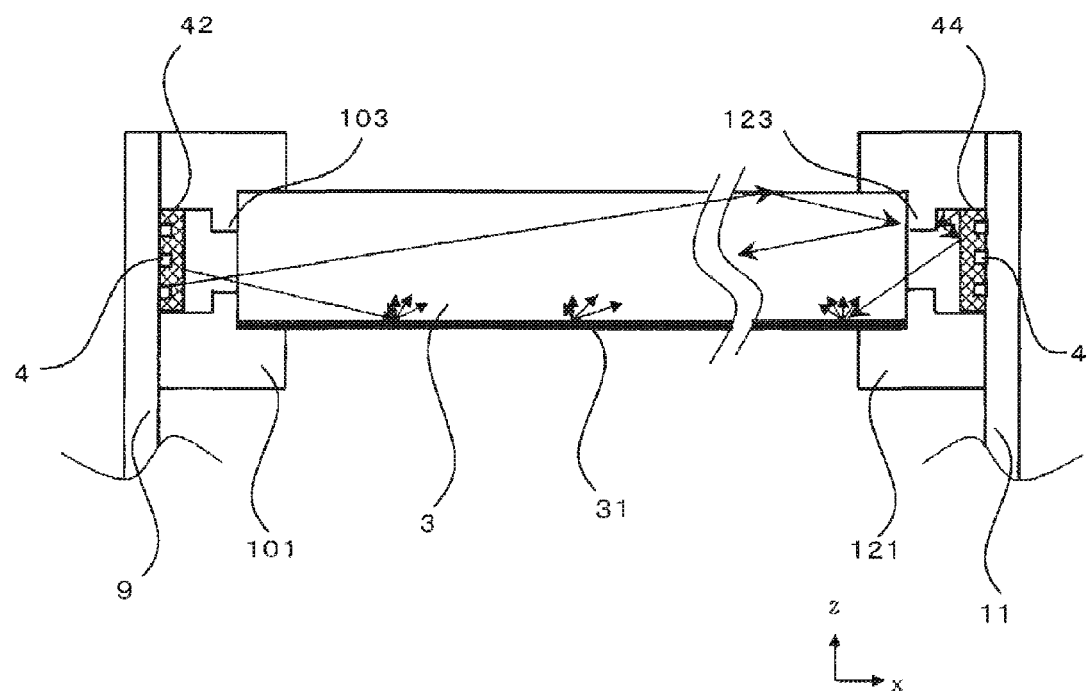
FIG. 15 is an illustration illustrating the transmission of light in the light guide for transmitted illumination in a state in which a light blocking portion is added to the holder of Embodiment 2.

FIG. 15 is an illustration illustrating the transmission of light in the light guide for transmitted illumination in a state in which a light blocking portion is added to the holder of Embodiment 2. The light transmits in the light guide 3 as illustrated in FIG. 15 in a state in which the holder 101 and the holder 121 are assembled as illustrated in FIG. 13.

The holder 101 and the holder 121 including the light blocking portion 102, the light blocking portion 122, the light blocking portion 103 and the light blocking portion 123 may be made of any material if light does not transmit therethrough. However, the holder 101 and the holder 121 are preferably made of white resin or metal of high reflectance if illumination efficiencies are considered. When the light blocking portion 102, the light blocking portion 122, the light blocking portion 103 and the light blocking portion 123 are disposed in front of a light-emitting surface of the light sources 4, the light that hits the light blocking portions is reflected in the directions of the flexible printed circuit board 9 and the flexible printed circuit board 11.

The light that hits the flexible printed circuit board 9 and the flexible printed circuit board 11 is further reflected and enters a range that is not the determined range that includes focuses of the shape of the end face of the end portion of the light guides 2 and enters e determined range that includes a focus of the shape of the end face of the end portion of the light guide 3. Thus, light entering ranges of the light guides 2 and the light guide 3 can be limited regardless of the setting position of the light sources 4. In this case, light can be efficiently irradiated onto the sheet of paper 17 by coating paint or plating or evaporating a metal having high reflectance onto the flexible printed circuit board 9 and the flexible printed circuit board 11. In addition, the flexible printed circuit board may be changed to aluminum boards having high reflectance.

Furthermore, the light that entered and penetrated the light guides 2 and the light guide 3 without being scattered at the light scattering portion 21 and the light scattering portion 31 is reflected on a plane on the side of the light guides 2 and the light guide 3 of the light blocking portion 102, the light blocking portion 122, the light blocking portion 103 and the light blocking portion 123 of the holder 101 and the holder 121, and the light is returned to the light guides 2 and the light guide 3. Thus the light can be effectively irradiated onto the sheet of paper 17. The light that transmits the light guides 2, is reflected at the light blocking portion 102 and the light blocking portion 122, and again enters the light guides 2 from the determined range that includes a focus of the shape of the end face of the end portion of the light guide. However, as the light transmits in the light guide taking a route as illustrated in FIG. 7C, the route never becomes the route as illustrated in FIG. 7A.

As described above, the image scanning apparatus of this Embodiment 2 can limit an area where light enters the light guide by arranging the holder 101 and the holder 121 having the light blocking portion 102, the light blocking portion 122, the light blocking portion 103 and the light blocking portion 123 regardless of the arrangement positions of the light sources 4. Therefore, the target light flux can be obtained, the number of disposable light sources 4 can be increased, and brighter illumination or illumination having a plurality of colors can be realized.

Embodiment 3.

In Embodiment 3, a light blocking area is provided in the light incidence plane of the light guides 2 and the light guide 3. The light guides 2 and the light guide 3 are formed of the same light guide (the same shape of the end face of the end portion). In Embodiment 3, a light guide whose shape of the end face of the end portion is a circle is described as an example. Any material is good for the light blocking area if light does not transmit there through. However, material having higher reflectance is desirable if the illumination efficiency is considered. White paint, silk printing, plating, metal vapor deposition, light reflective tape or the like may be provided. In addition, a sheet metal, white resin or the like may be filled in the light guides 2 and light guide 3 themselves by insert molding or two-color molding.

Figure 16:
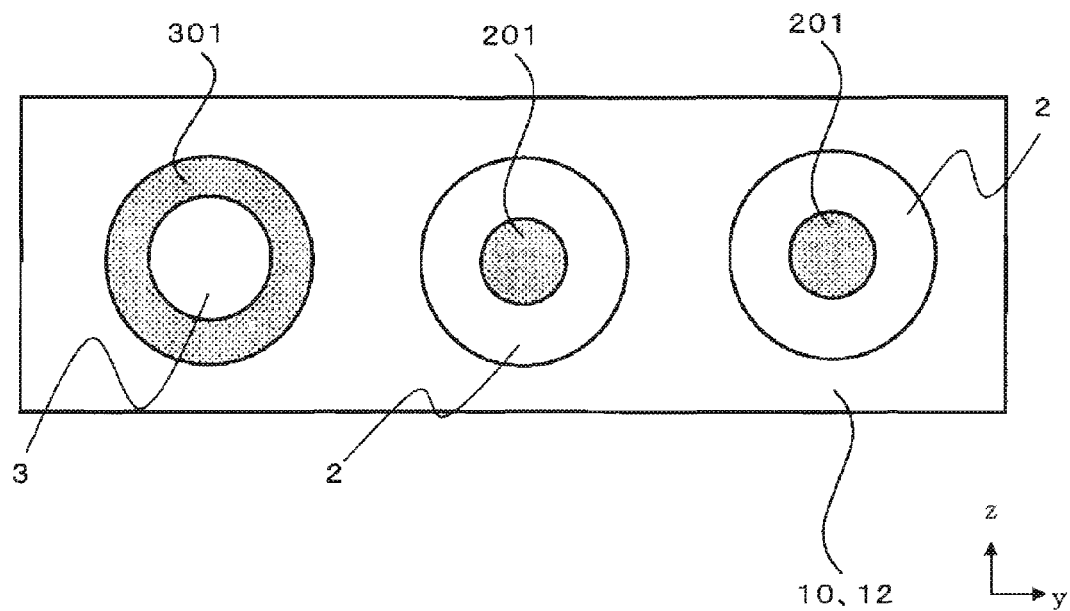
FIG. 16 is an illustration illustrating a state in which a light blocking area is provided on the light incidence plane of the light guide according to Embodiment 3 of the present disclosure.

FIG. 16 is an illustration illustrating a state in which a light blocking area is provided on the light incidence plane of the light guide according to Embodiment 3 of the present disclosure. In the example of FIG. 16, the light blocking area 201 is provided in the determined range that includes a focus of the light incidence plane of the light guides 2, and the light blocking area 301 is provided in a range (vicinity of the outer periphery) that is not the determined range that includes a focus of the light incidence plane of the light guide 3.

Figure 17:
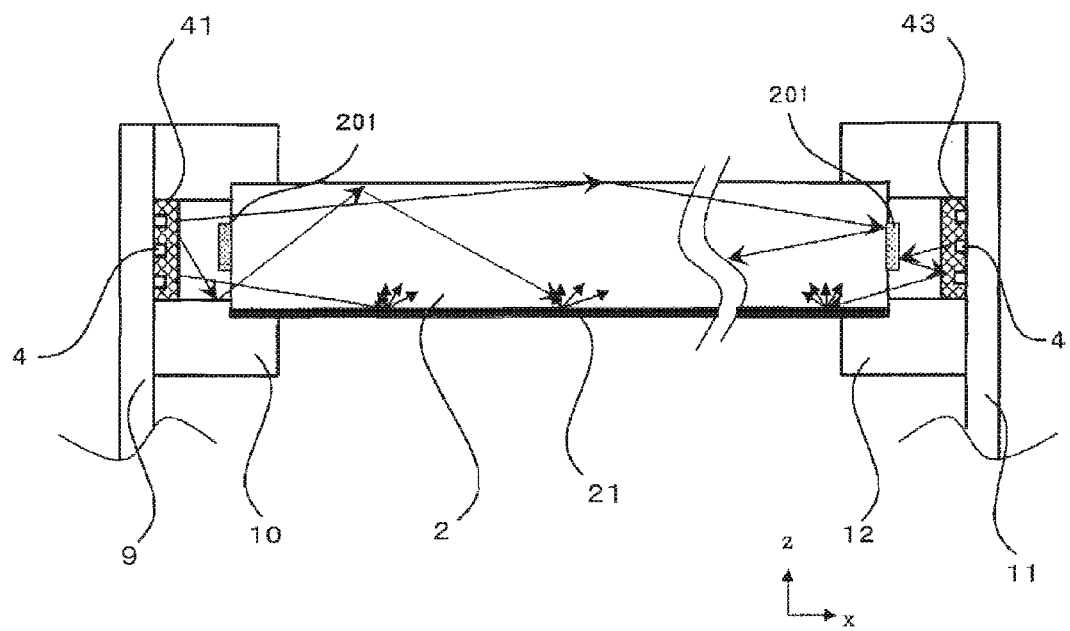
FIG. 17 is an illustration illustrating the transmission of light in the light guide for reflected illumination in a state in which a light blocking area is provided on the light incidence plane of the light guide according to Embodiment 3.

FIG. 17 is an illustration illustrating the transmission of light in the light guide for reflected illumination in a state in which a light blocking area is provided on the light incidence plane of the light guide according to Embodiment 3. Light transmits in the light guides 2 as illustrated in FIG. 17 in a state in which the light blocking area 201 is provided in the determined range that includes a focus of the light incidence plane of the light guides 2 as illustrated in FIG. 16.

Figure 18:
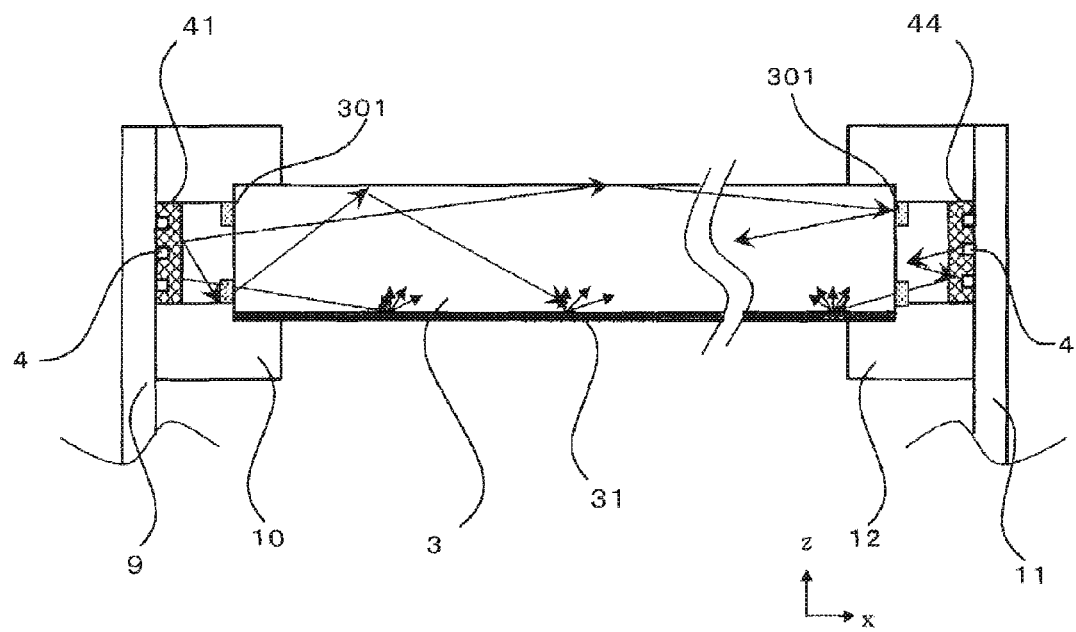
FIG. 18 is an illustration illustrating the transmission of light in the light guide for transmitted illumination in a state in which a light blocking area is provided on the light incidence plane of the light guide according to Embodiment 3.

FIG. 18 is an illustration illustrating the transmission of light in the light guide for transmitted illumination in a state in which a light blocking area is provided on the light incidence plane of the light guide according to Embodiment 3. Light transmits in the light guide 3 as illustrated in FIG. 18 in a state in which the light blocking area 301 is provided in a range (vicinity of the outer periphery) that is not the determined range that includes a focus of the light incidence plane of the light guide 3 as illustrated in FIG. 16.

As described above, similar to Embodiment 2, the image scanning apparatus of Embodiment 3 can limit an optical area where light enters the light guides 2 and the light guide 3 regardless of the arrangement positions of the light sources 4. Therefore, the target light flux can be obtained, the number of disposable light sources 4 can be increased, and brighter illumination or illumination having a plurality of colors can be realized.

Embodiment 4.

In Embodiment 4, a light blocking area is provided in the implementation area of the light sources. Any material is good for the light blocking area if light does not transmit therethrough. However, material having higher reflectance is desirable if the illumination efficiency is considered. For example, white paint, silk printing, plating, metal vapor deposition, light reflective tape or the like may be provided. The light guides 2 and the light guide 3 are formed of the same light guide (the same shape of the end face of the end portion). In Embodiment 4, a light guide whose shape of the end face of the end portion is a circle is described as an example.

Figure 19:
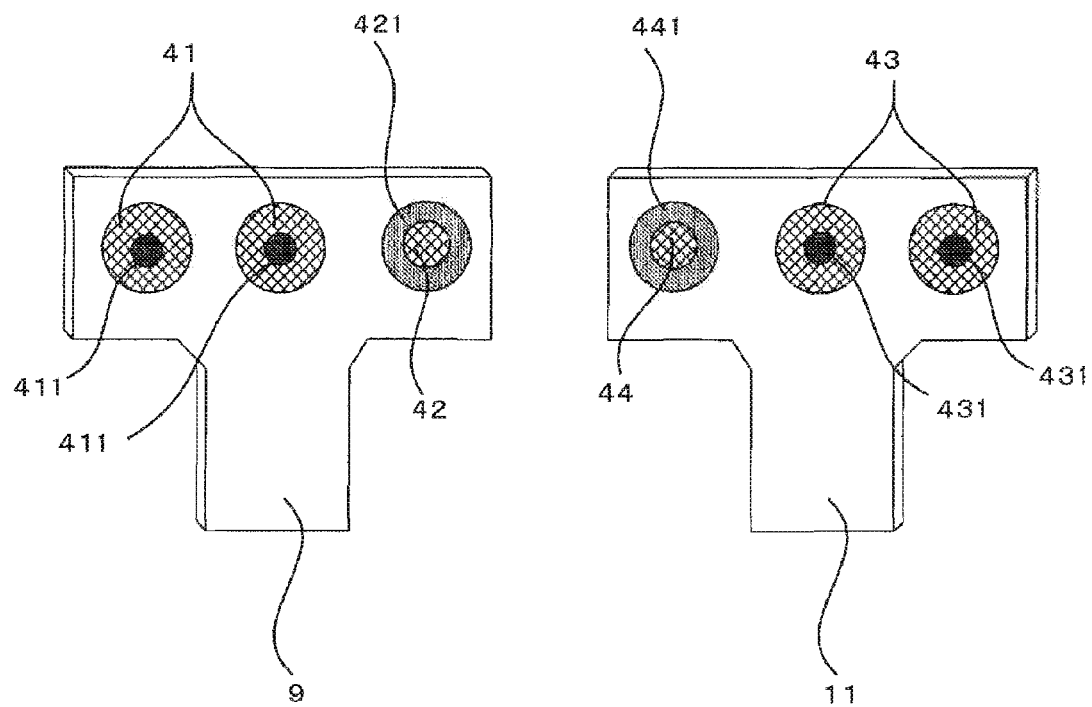
FIG. 19 is an illustration illustrating a state in which a light blocking area is provided in the implementation area of the light source according to Embodiment 4 of the present disclosure.

FIG. 19 is an illustration illustrating a state in which a light blocking area is provided in the implementation area of the light source according to Embodiment 4 of the present disclosure. In the example of FIG. 19, light blocking areas 411, a light blocking area 421, light blocking areas 431 and a light blocking area 441 are provided respectively on the areas 41, the area 42, the areas 43 and the area 44 where the light sources 4 of the flexible printed circuit board 9 and the flexible printed circuit board 11 are implemented. The light blocking areas 411 and the light blocking areas 431 are provided in the vicinity of the center of the areas 41 and the areas 43. The light blocking area 421 and the light blocking area 441 are provided near the outer periphery of the area 42 and the area 44 respectively.

Figure 20:
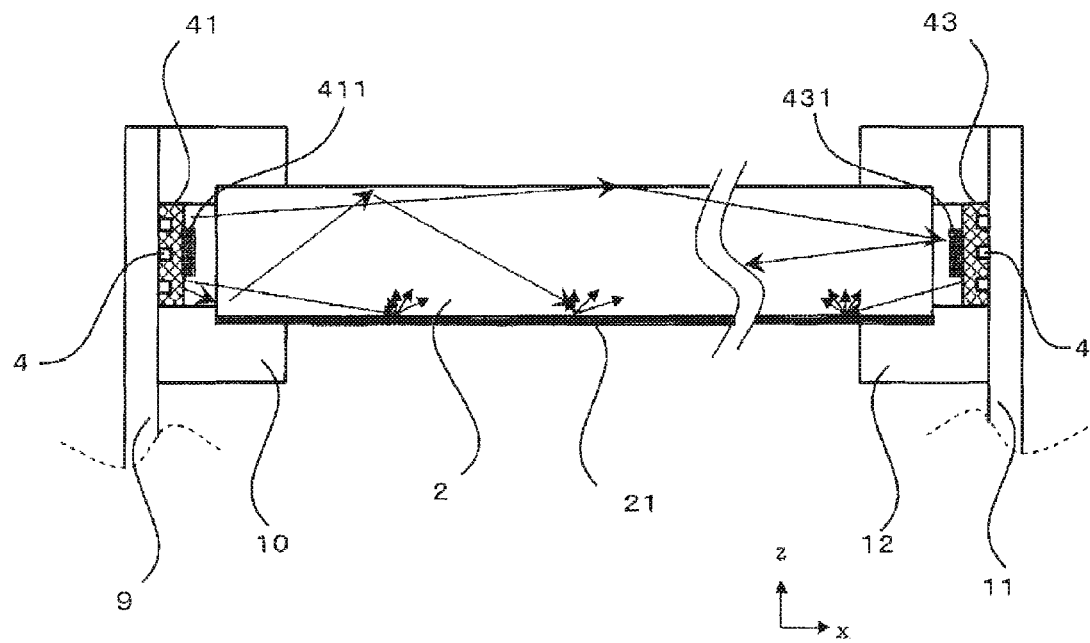
FIG. 20 is an illustration illustrating the transmission of light in the light guide for reflected illumination in a state in which a light blocking area is provided in the implementation area of the light source according to Embodiment 4.

FIG. 20 is an illustration illustrating the transmission of light in the light guide for reflected illumination in a state in which a light blocking area is provided in the implementation area of the light source according to Embodiment 4. Light transmits in the light guides 2 as illustrated in FIG. 20 in a state in which a light blocking area is provided in a light source implementation area corresponding to a determined range that includes a focus of the facing light incidence planes of the light guides 2 as illustrated in FIG. 19.

Figure 21:
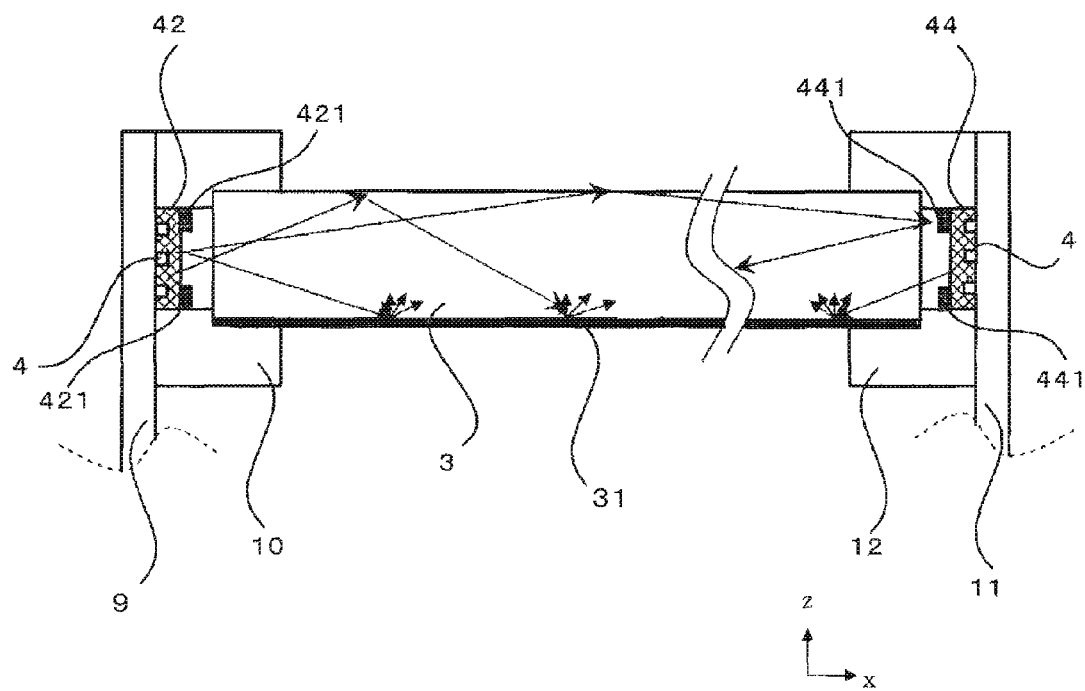
FIG. 21 is an illustration illustrating the transmission of light in the light guide for transmitted illumination in a state in which a light blocking area is provided in the implementation area of the light source according to Embodiment 4.

FIG. 21 is an illustration illustrating the transmission of light in the light guide for transmitted illumination in a state in which a light blocking area is provided in the implementation area of the light source according to Embodiment 4. Light transmits in the light guide 3 as illustrated in FIG. 21 in a state in which a light blocking area is provided in a light source implementation area corresponding to a range (vicinity of the outer periphery) that is not the determined range that includes a focus of the facing light incidence planes of the light guide 3 as illustrated in FIG. 19.

As described above, similar to Embodiment 2 and Embodiment 3, the image scanning apparatus of Embodiment 4 can limit a light area where light enters the light guides 2 and the light guide 3 regardless of the arrangement positions of the light sources 4. Therefore, the target light flux can be obtained, the number of disposable light sources 4 can be increased, and brighter illumination or illumination having a plurality of colors can be realized.

Embodiment 5.

Embodiment 1 to Embodiment 4 handle light guides whose focuses of the shape of the end face of the end portion such as a circle and/or an ellipse are definite. However, Embodiment 5 handles a light guide whose focus of the shape of the end face of the end portion is not definite. The following describes a setting method of a deemed focus when the focus of the shape of the end face of the end portion of the light guide 2 having the light scattering portion 21 is not definite. This similarly applies to the light guide 3.

Figure 22:
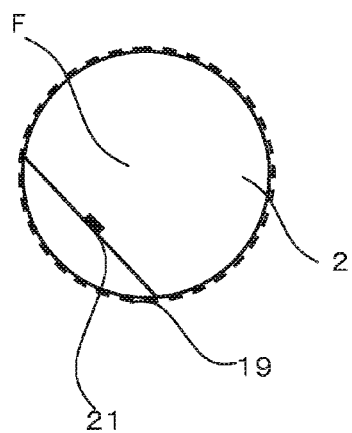
FIG. 22 is a cross section of the light guide according to Embodiment 5 of the present disclosure, wherein a part of the circular cross section of the shape of the end face of the end portion of the light guide is D-cut.

FIG. 22 is a cross section of the light guide according to Embodiment 5 of the present disclosure, wherein a part of the circular cross section of the shape of the end face of the end portion of the light guide is D-cut. In this case, different from the light guide 2 whose shape of the end face of the end portion is a circle, a complete focus does not exist. However, as a part of a shape of the end face of the end portion of the light guide is a circle, the focus can be considered as the focus of the circle before the circle is D-cut. Therefore, when the shape of the end face of the end portion is as illustrated in FIG. 22, the focus of the approximate curve 19 approximated by a circle is set to be a deemed focus F of the end face of the end portion of the light guide 2.

Figure 23:
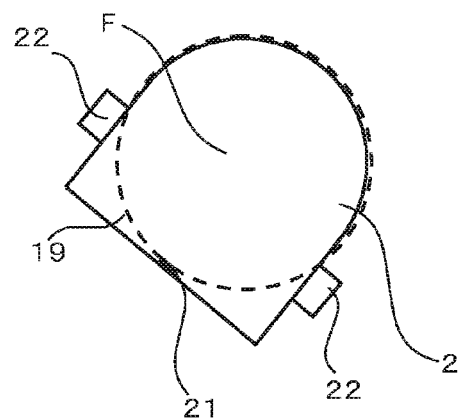
FIG. 23 is a cross section of the light guide according to Embodiment 5, wherein projections and a square are combined with a part of the circular cross section of the shape of the end face of the end portion of the light guide.

FIG. 23 is a cross section of the light guide according to Embodiment 5, wherein projections and a square are combined with a part of the circular cross section of the shape of the end face of the end portion of the light guide. In the light guide 2 where the shape of the end face of the end portion is a combination of a circle and quadrangles, approximation may be performed only by a circular portion facing the light scattering portion 21 where a focus exists. Thus, as the approximate curve 19 is also circular; the deemed focus F is positioned at an approximate center of the shape of the end face of the end portion of the light guide 2. In addition, although projections 22 are added to the side surface of the light guide 2, the projections 22 may be neglected because the area thereof is small relative to the cross section of the light guide 2, and the projections 22 do not greatly affect guiding light in the light guide 2.

Figure 24:
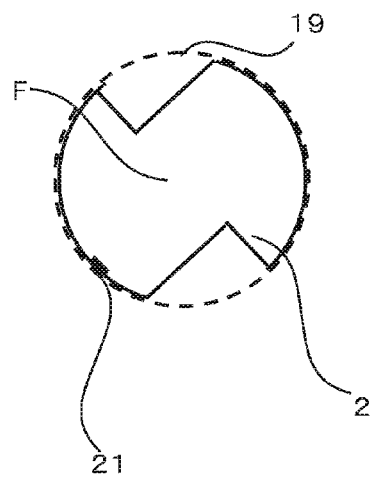
FIG. 24 is a cross section of the light guide according to Embodiment 5, wherein squares and a circle are combined to form the shape of the cross section of the shape of the end face of the end portion of the light guide.

FIG. 24 is a cross section of the light guide according to Embodiment 5, wherein squares and a circle are combined to form the shape of the cross section of the shape of the end face of the end portion of the light guide. This is an example of a shape in which a part of a circle is cut by the shape of the end face of the end portion. The approximate curve 19 becomes also circular in this case. The deemed focus F is positioned at an approximate center of the shape of the end face of the end portion of the light guide 2.

Figure 25:
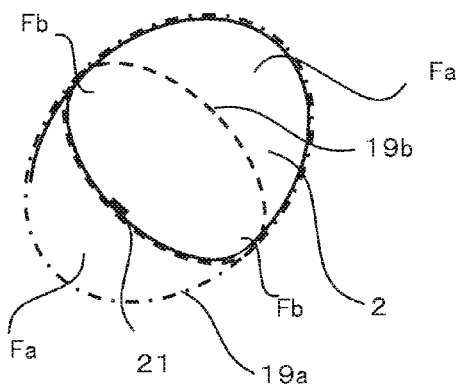
FIG. 25 is a cross section of the light guide according to Embodiment 5, wherein two types of ellipses are combined to form the shape of the cross section of the shape of the end face of the end portion of the light guide.

FIG. 25 is a cross section of the light guide according to Embodiment 5, wherein two types of ellipses are combined to form the shape of the cross section of the shape of the end face of the end portion of the light guide. In this case, a deemed focus F is determined from the approximate curve 19a of a plane facing the light scattering portion 21 and the approximate curve 19b of a plane on which the light scattering portion 21 is provided. As both of the approximate curve 19a and the approximate curve 19b are ellipses, there are two deemed focuses Fa and two deemed focuses Fb, that is, there are four deemed focuses F in total. However, as the deemed focuses Fa close to the light scattering portion 21 are positioned outside the shape of the end face of the end portion of the light guide 2, the deemed focuses Fa may be neglected.

Figure 26:
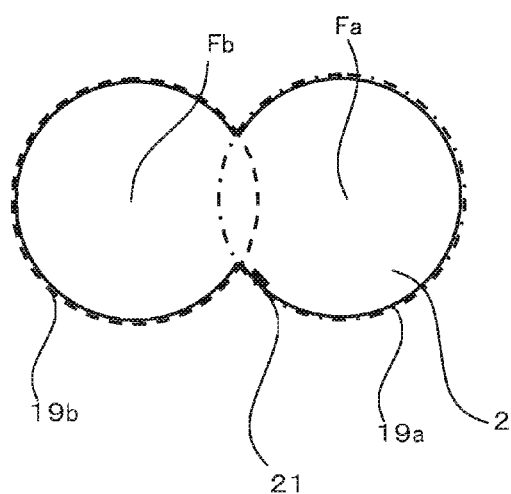
FIG. 26 is a cross section of the light guide according to Embodiment 5, wherein two circles are combined to form the shape of the end face of the end portion of the light guide so that the two circles are partially superimposed.

FIG. 26 is a cross section of the light guide according to Embodiment 5, wherein two circles are combined to form the shape of the end face of the end portion of the light guide so that the two circles are partially superimposed. In this case, the approximate curve 19a and the approximate curve 19b are set for each circle included in the shape of the end face of the end portion and the focuses are set as deemed focuses F of the shape of the end face of the end portion of the light guide. As both of the approximate curve 19a and the approximate curve 19b in FIG. 26 are circular, there would be two deemed focuses, the deemed focus Fa and the deemed focus Fb. In addition, FIG. 26 illustrates a case in which circles are combined. Similarly, in the cases of combinations of two or more shapes or combinations with an ellipse, one may obtain an approximate curve 19 and may set the focus as a deemed focus F.

Figure 27:
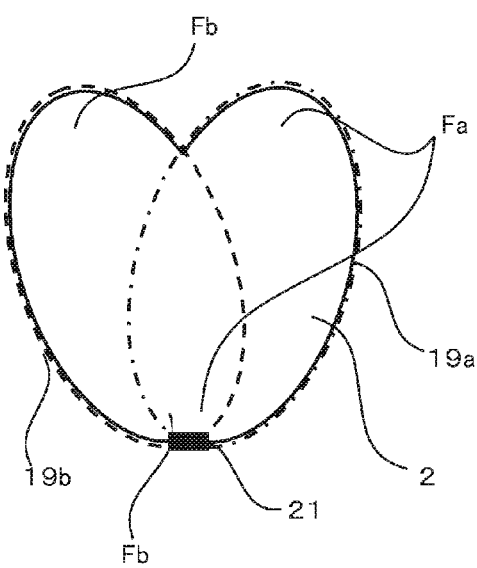
FIG. 27 is a cross section of the light guide according to Embodiment 5, wherein two ellipses are combined to form the shape of the cross section of the shape of the end face of the end portion of the light guide to be partially superimposed.

FIG. 27 is a cross section of the light guide according to Embodiment 5, wherein two ellipses are combined to form the shape of the cross section of the shape of the end face of the end portion of the light guide to be partially superimposed. In this case, similar to FIG. 25, two ellipses may be set as the approximate curve 19a and the approximate curve 19b. In the case of FIG. 27, different from FIG. 25, as all four deemed focuses Fa and Fb are in the end face of the end portion of the light guide, the light sources 4, the light blocking area 201 and the like are required to be arranged considering all deemed focuses Fa and Fb.

As described above, the image scanning apparatus of Embodiment 5 can use a light guide whose focus of the shape of the end face of the end portion of the light guide is not definite by regarding the focus of the approximate curve of a circle, an ellipse or a parabola included in the shape of the end face of the end portion of the light guide as the focus of the shape of the end face of the end portion of the light guide. Although not illustrated, even in a case in which a part of a parabola is included in the shape of the end face, a focus of an approximate curve of a parabola can similarly be regarded as a focus of the shape of the end face of the end portion of the light guide.

The foregoing describes some example embodiments for explanatory purposes. Although the foregoing discussion has presented specific embodiments, persons skilled in the art will recognize that changes may be made in form and detail without departing from the broader spirit and scope of the disclosure. Accordingly, the specification and drawings are to be regarded in an illustrative rather than a restrictive sense. This detailed description, therefore, is not to be taken in a limiting sense, and the scope of the disclosure is defined only by the included claims, along with the full range of equivalents to which such claims are entitled.

This application claims the benefit of Japanese Patent Application No. 2014-053335 including the specification, the claims, the figures and the abstract, filed on Mar. 17, 2014, the entire disclosure of which is incorporated by reference herein.

INDUSTRIAL APPLICABILITY

The present disclosure is applicable, for example, to image scanning apparatuses such as a facsimile, a copying machine, a reading device of valuable papers and the like.

REFERENCE SIGNS LIST 1, 1a Top glass
2, 3 Light guide
4 Light source
5, 5a Rod lens array
6, 6a Photoelectric conversion element array
7, 7a Printed circuit board
8, 8a Housing
9, 11 Flexible printed circuit board
10, 12, 101, 121 Holder
17 Sheet of paper
18, 18a Reading area
19, 19a, 19b Approximate curve
20 Roller
21, 31 light scattering portion
22 Projection
41 to 44 Area
51, 51a Signal processor
52, 52a Signal output
53, 53a AD converter
54, 54a Black corrector
55, 55a White corrector
56, 56a Image output
91, 91a Image scanning apparatus
102, 103, 122, 123 Light blocking portion
201, 211, 301, 311, 411, 421, 431, 441 light blocking area
F, Fa, Fb Deemed focus

The invention claimed is:
1. A lighting apparatus comprising a first illumination portion and a second illumination portion, each including a bar-like light guide that includes an end face of a peripheral shape that includes at least a part of a circle, an ellipse or a parabola, and light source elements provided to face an end face of the light guide,
wherein light enters the light guide of the second illumination portion in a determined range in which a focus of the circle, the ellipse or the parabola included in the shape of the end face of the light guide is included, and
wherein in the first illumination portion, the light source elements are disposed in a range that is not the determined range in which the focus of the shape of the end face of the light guide is included and light enters the light guide of the first illumination portion in the range that is not the determined range in which the focus of the circle, the ellipse or the parabola included in the shape of the end face of the light guide is included.
2. The lighting apparatus according to claim 1, wherein in the second illumination portion, the light source elements are disposed in the determined range in which the focus of the shape of the end face of the light guide is included.
3. An image scanning apparatus comprising:
the lighting apparatus according to claim 2 to irradiate light onto a scanning object and extends in a main scanning direction;
a rod lens array to image light irradiated from the lighting apparatus and reflected by the scanning object or the light transmitted through the scanning object; and
a photoelectric conversion element array to convert light imaged by the rod lens array into an electrical signal, wherein
the first illumination portion irradiates a first reading area with the light that is inclined at a determined angle from a normal direction of the scanning object, and
the second illumination portion irradiates a second reading area away from the first reading area in a sub-scanning direction with light in the normal direction of the scanning object.
4. The lighting apparatus according to claim 1, wherein the first illumination portion and the second illumination portion further comprise light blocking members disposed between the light guide and the light source elements,
in the first illumination portion, the light entering the determined range, in which the focus of the shape of the end face of the light guide is included, is blocked by the light blocking member, and
in the second illumination portion, the light entering the range that is not the determined range, in which the focus of the shape of the end face of the light guide is included, is blocked by the light blocking member.
5. An image scanning apparatus comprising:
the lighting apparatus according to claim 4 to irradiate light onto a scanning object and extends in a main scanning direction;
a rod lens array to image light irradiated from the lighting apparatus and reflected by the scanning object or the light transmitted through the scanning object; and
a photoelectric conversion element array to convert light imaged by the rod lens array into an electrical signal, wherein
the first illumination portion irradiates a first reading area with the light that is inclined at a determined angle from a normal direction of the scanning object, and the second illumination portion irradiates a second reading area away from the first reading area in a sub-scanning direction with light in the normal direction of the scanning object.

6. The lighting apparatus according to claim 1, wherein in the first illumination portion, a light blocking area is provided in the determined range in which the focus of the shape of an end face of a light incidence plane of the light guide is included, and in the second illumination portion, a light blocking area is provided in the range that is not the determined range in which the focus of the shape of the end face of the light incidence plane of the light guide is included.

7. An image scanning apparatus comprising:

the lighting apparatus according to claim 6 to irradiate light onto a scanning object and extends in a main scanning direction;

a rod lens array to image light irradiated from the lighting apparatus and reflected by the scanning object or the light transmitted through the scanning object; and a photoelectric conversion element array to convert light imaged by the rod lens array into an electrical signal, wherein the first illumination portion irradiates a first reading area with the light that is inclined at a determined angle from a normal direction of the scanning object, and the second illumination portion irradiates a second reading area away from the first reading area in a sub-scanning direction with light in the normal direction of the scanning object.

8. An image scanning apparatus comprising:

the lighting apparatus according to claim 1 to irradiate light onto a scanning object and extends in a main scanning direction;

a rod lens array to image light irradiated from the lighting apparatus and reflected by the scanning object or the light transmitted through the scanning object; and a photoelectric conversion element array to convert light imaged by the rod lens array into an electrical signal, wherein the first illumination portion irradiates a first reading area with the light that is inclined at a determined angle from a normal direction of the scanning object, and the second illumination portion irradiates a second reading area away from the first reading area in a sub-scanning direction with light in the normal direction of the scanning object.

\* \* \* \* \*